(12) United States Patent
Shah et al.

(10) Patent No.: US 10,145,444 B2
(45) Date of Patent: Dec. 4, 2018

(54) SYSTEMS FOR A CRANKSHAFT DAMPER COVER

(71) Applicant: Ford Global Technologies, LLC, Dearborn, MI (US)

(72) Inventors: Shashin Shah, Farmington Hills, MI (US); Shaji Mathews, Ypsilanti, MI (US); Chuck Raymond Kvasnicka, Grosse Ile, MI (US); Nathaniel David Hansen, Canton, MI (US); Tom Xu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 124 days.

(21) Appl. No.: 15/218,941

(22) Filed: Jul. 25, 2016

(65) Prior Publication Data

US 2018/0023658 A1    Jan. 25, 2018

(51) Int. Cl.
| F16F 15/12 | (2006.01) |
| F16H 55/36 | (2006.01) |
| F16F 15/126 | (2006.01) |

(52) U.S. Cl.
CPC ............. *F16F 15/12* (2013.01); *F16H 55/36* (2013.01); *F16F 15/126* (2013.01)

(58) Field of Classification Search
CPC ...................................................... F16F 15/12
USPC ...................................................... 123/192.1
See application file for complete search history.

(56) References Cited

U.S. PATENT DOCUMENTS

| 2,724,983 A | 11/1955 | O'Connor |
| 4,794,816 A | 1/1989 | Serizawa et al. |
| 6,875,113 B2 | 4/2005 | Nichols |
| 8,287,390 B2 | 10/2012 | Reinhart |
| 8,419,574 B2 * | 4/2013 | Serkh ................. F16F 15/1216 474/94 |
| 9,004,251 B2 * | 4/2015 | Ikegawa ............... F16D 27/105 192/81 C |
| 9,599,209 B2 * | 3/2017 | Manzoor ................ F16H 55/36 |
| 2006/0038333 A1 | 2/2006 | Hwang |
| 2009/0000421 A1 * | 1/2009 | Christenson .......... F16F 15/126 74/574.4 |
| 2010/0230227 A1 * | 9/2010 | Parsons .................. B60K 25/02 192/65 |
| 2013/0252745 A1 * | 9/2013 | Shirai ....................... F16D 3/68 464/73 |
| 2013/0341150 A1 * | 12/2013 | Ikegawa ............... F16D 27/105 192/80 |
| 2014/0194237 A1 | 7/2014 | Wolf |

FOREIGN PATENT DOCUMENTS

| CN | 103883673 A | 6/2014 |
| CN | 104295663 A | 1/2015 |
| WO | 2016019284 A1 | 2/2016 |

* cited by examiner

*Primary Examiner* — Joseph Dallo
*Assistant Examiner* — Yi-Kai Wang
(74) *Attorney, Agent, or Firm* — Julia Voutyras; McCoy Russell LLP

(57) ABSTRACT

Systems are provided for a damper cover for an engine crankshaft damper. In one example, a damper cover may include a frame and an inset, with extensions of the frame adapted to couple to slots of an engine crankshaft damper, and with portions of the inset positioned between each extension and each corresponding slot. As one example, the frame may be comprised of metal and the inset may be comprised of a damping material such as foam or rubber.

20 Claims, 12 Drawing Sheets

SYSTEMS FOR A CRANKSHAFT DAMPER COVER

FIELD

The present description relates generally to a crankshaft damper cover for a crankshaft of an engine.

BACKGROUND/SUMMARY

Internal combustion engines, such as gasoline engines, include a crankshaft that is rotated via reciprocating operation of cylinders of the engine. The torque produced via the crankshaft is transmitted from one end of the crankshaft to the wheels of a vehicle in which the engine is installed. The other end of the crankshaft is used to drive various auxiliary machinery (e.g., accessories), such as alternators, power steering and air conditioning compressors. During engine operation, the crankshaft may experience varying levels of torsional vibration due to the sequential explosion of combustible gases in the cylinders. Torsional vibration can greatly reduce crankshaft life and cause crankshaft degradation or degradation of other engine components if the crankshaft runs at or through resonance. The vibrations can also cause noises such as a "whine" or knocking, both of which may be undesirable to a vehicle operator. In some examples, a damper (e.g., torsional vibration damper) is positioned at an end of the crankshaft (e.g., the free, accessory drive end of the crankshaft) in order to reduce these torsional vibrations. The damper may include an inner metal hub directly attached to the end of the crankshaft, one or more inertia plates, and one or more cover plates covering the inertia plates within the hub. In some examples, an additional cover, such as the metal hat-like member shown in U.S. Pat. No. 4,794,816, may be used to cover an end of the assembled damper.

However, the inventors herein have recognized potential issues with such systems and conventional crankshaft dampers. As one example, the damper alone, or additional metal covers coupled to the damper, may not sufficiently reduce noise, vibration, and harness (NVH) from the engine crankshaft, thereby resulting in component degradation and undesirable noise experienced by the vehicle operator. Further, mechanically fixing components (e.g., via bolting), such as covers, to the damper may result in an increased number of parts and thus increased component costs. Additionally, fixing components together in this way may require increased assembly time and labor costs.

In one example, the issues described above may be addressed by a system, comprising a crankshaft damper cover, the crankshaft damper comprising: a frame including a first plurality of extensions arranged around a perimeter of the frame and extending from a base of the frame in a direction of a centerline of the cover; and an inset molded around the frame and including a second plurality of extensions aligned with the first plurality of extensions. As one example, the inset may comprise a rubber or foam material and the inset may be formed as one piece with the frame. In this way, the inset may further reduce NVH from the crankshaft. As another example, the frame may comprise a material (e.g., metal) that is rigid relative to the material of the inset in order to retain a shape of the damper cover. Additionally, the damper cover may easily mate with (e.g., plug into) and couple to the crankshaft damper body via without the aid of additional mechanical fixers (such as bolts). This may reduce component costs and assembly time for the crankshaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-12 are shown to scale, though other relative dimensions may be used.

DETAILED DESCRIPTION

Figure 1:
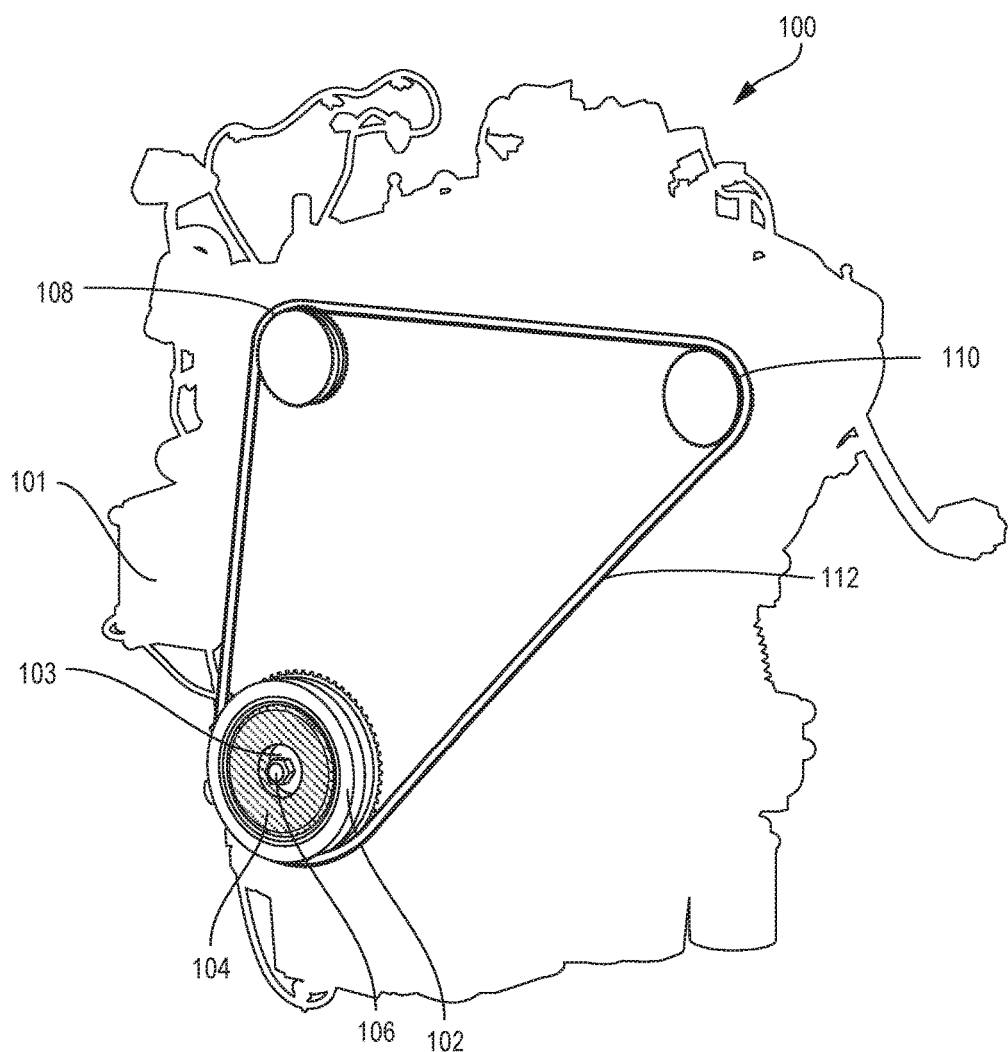
FIG. 1 shows an example of an engine including a crankshaft damper and a damper cover coupled to the crankshaft damper.
Figure 2:
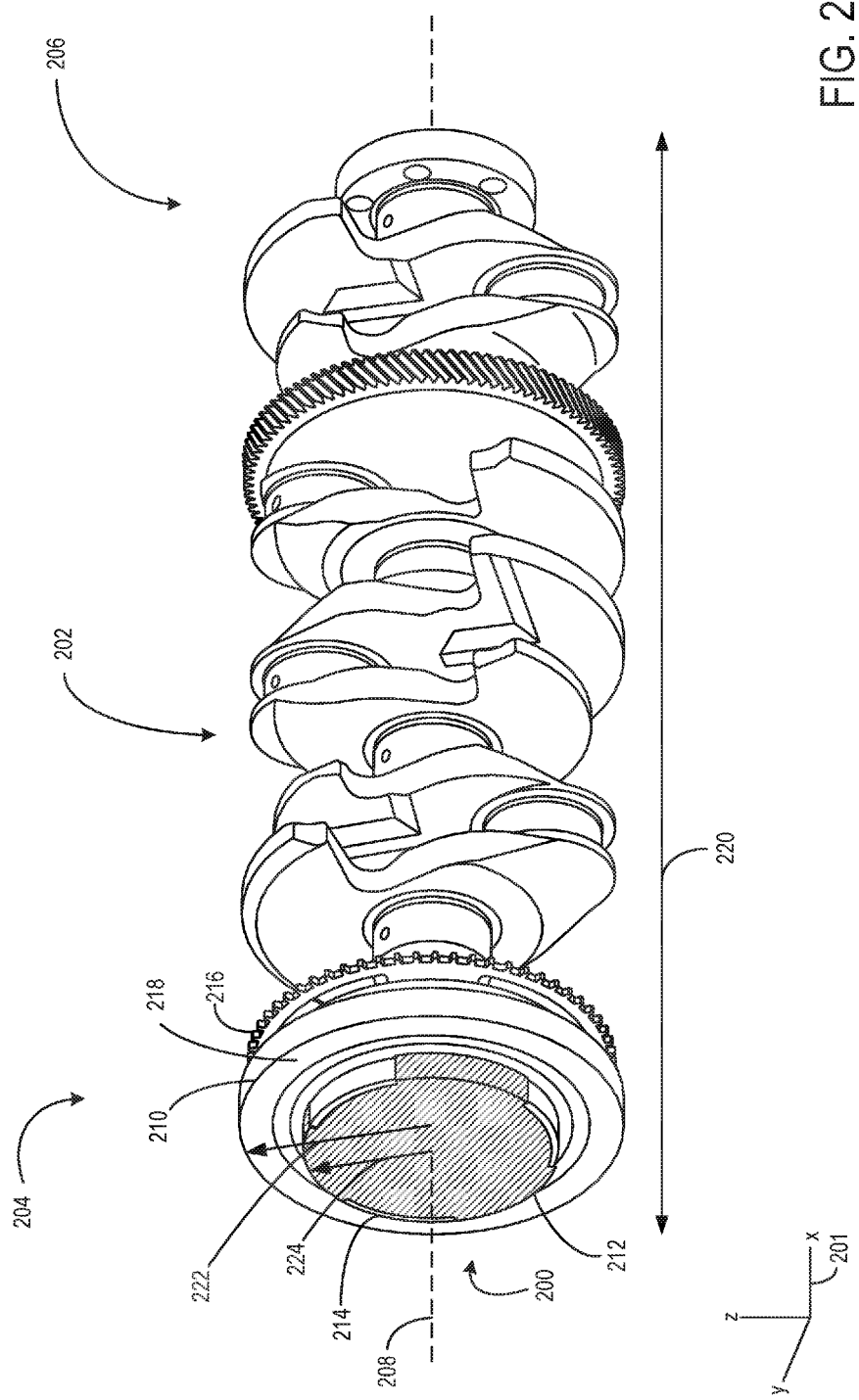
FIG. 2 shows a first embodiment of a damper cover coupled to a crankshaft damper at an end of a crankshaft of an engine.
Figure 7:
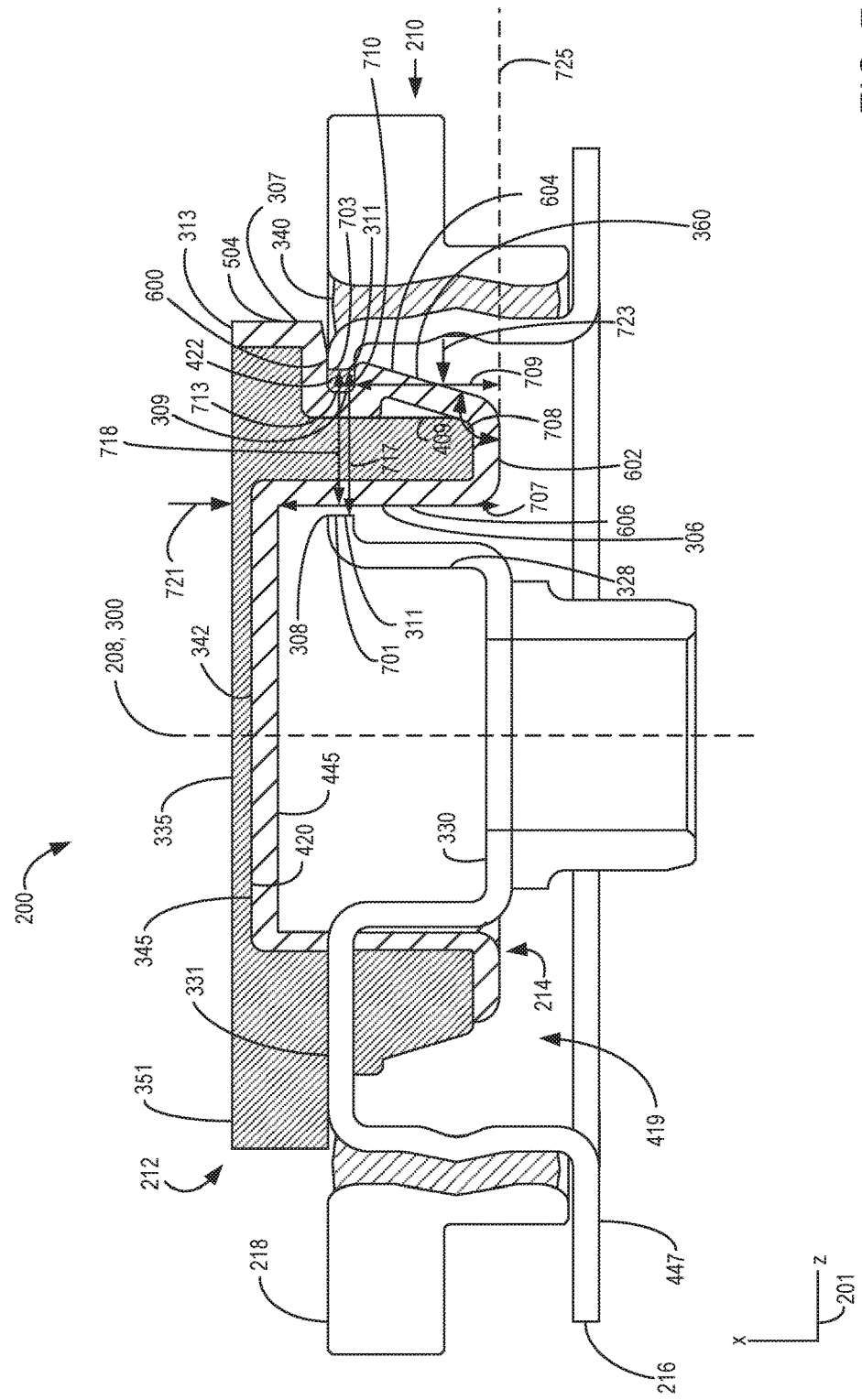
FIG. 7 shows a cross-sectional view of the first embodiment of the damper cover coupled to the crankshaft damper.
Figure 8:
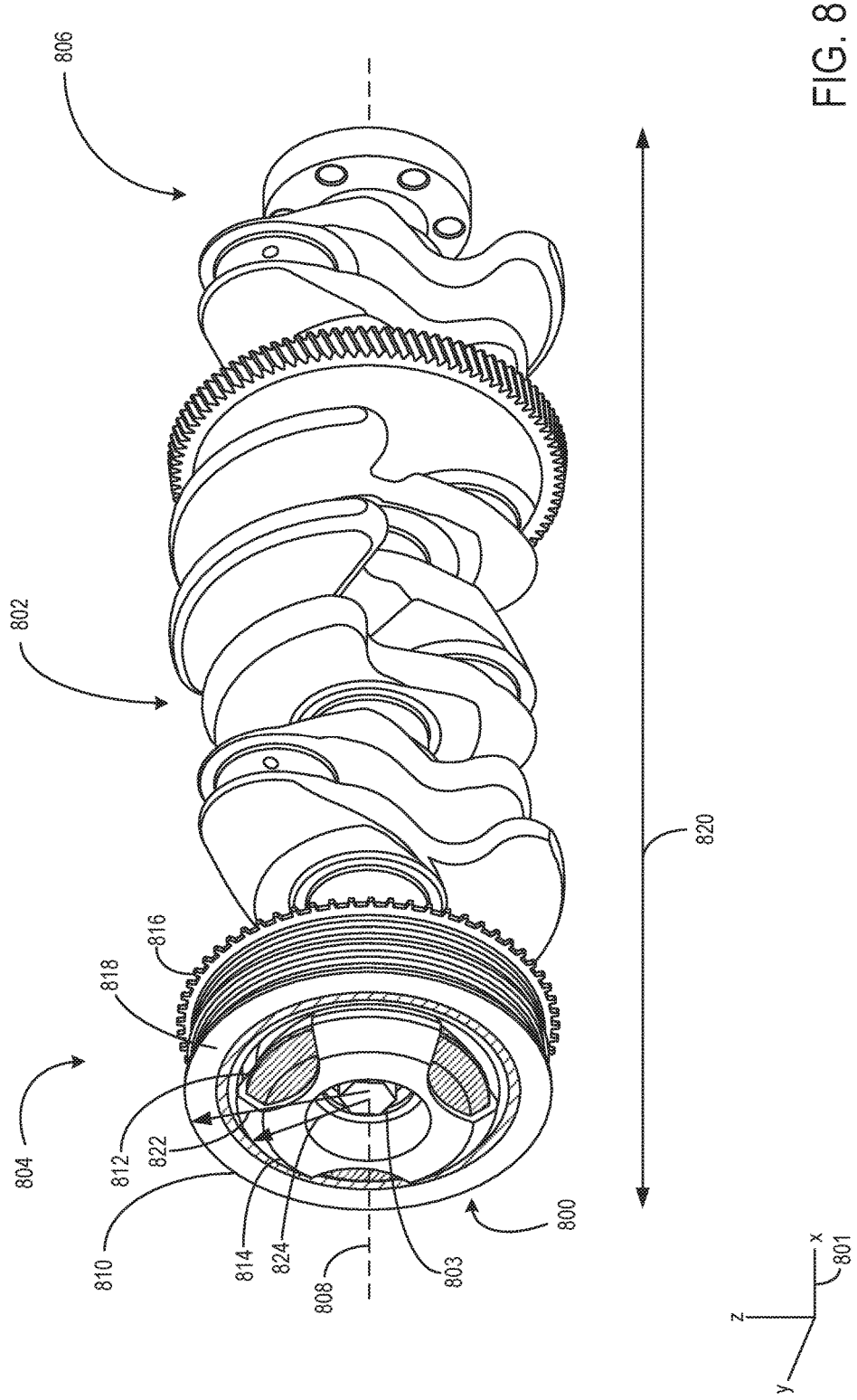
FIG. 8 shows a second embodiment of a damper cover coupled to a crankshaft damper at an end of a crankshaft of an engine.

The following description relates to systems and methods for a crankshaft damper cover for a damper of a crankshaft in an engine. An engine includes a crankshaft damper coupled (e.g., by belt, chain, etc.) to one or more pulleys of the engine, as shown by FIG. 1. The crankshaft damper is coupled to a free, accessory drive end of a crankshaft, as shown by FIG. 2 and FIG. 8, to reduce crankshaft noise, vibration, and harshness (NVH) due to engine operation. The crankshaft damper includes a damper cover for further reducing NVH and to cover an end of the damper, as shown by FIG. 2 and FIG. 8. The damper cover includes a frame and an inset, with the frame and inset shaped to couple to the crankshaft damper, as shown by FIGS. 3-4 and FIGS. 9-10. The inset and frame are molded together (e.g., permanently coupled to form the damper cover) and the inset partially surrounds a plurality of extensions of the frame, as shown by FIGS. 5-7 and FIGS. 11-12. In one example, the crankshaft damper includes a plurality of elongate slots arranged along a surface of the crankshaft damper positioned proximate to an outermost planar surface of the crankshaft damper, and the extensions of the frame are shaped to fit within the elongate slots to couple the damper cover to the damper. The inset surrounds the frame at one or more locations where the damper cover is coupled to the damper, as shown by FIG. 7. In another example, a plurality of elongate slots are arranged along a surface positioned proximate to an innermost planar surface of the crankshaft damper, and the damper cover is shaped to fit within the damper and to couple to the crankshaft damper via extensions of the frame. The inset partially surrounds each extension of the frame at each location where the extensions of the frame couple to the damper in order to further reduce NVH. In these embodiments, structural features on the damper and/or frame may provide mechanisms for locking the damper cover within the damper. In this way, the damper cover may be directly coupled (e.g., secured) to the damper without the use of additional mechanical fixation implements (e.g., bolts, screws, or adhesives) and may further reduce NVH through a rubber or foam material of the inset of the cover.

Similar components in FIGS. 1-12 are labeled similarly and may only be explained once below and not re-introduced with reference to each figure.

FIG. 1 shows a schematic depiction of an engine assembly 100 including an engine 101, a crankshaft damper 102 (e.g., torsional vibration damper), and a crankshaft damper cover 104 (e.g., noise, vibration, and harshness, NVH, cover). The crankshaft damper 102 is secured to an end 103 of a crankshaft of the engine 101 by a bolting apparatus 106. Specifically, the crankshaft, driven by cylinders of the engine 101, includes a first end that drives wheels of a vehicle in which the engine assembly 100 is installed and the second end 103 (referred to herein as an accessory drive end, a free end, or an exposed end of the crankshaft) that is free and drives one or more auxiliary apparatuses (e.g., accessories) via a tensioning device 112 (e.g., a belt, chain, etc.) coupled to one or more auxiliary pulleys, such as first auxiliary pulley 108 and second auxiliary pulley 110. In one example, the one or more auxiliary apparatuses may include a camshaft, an alternator, a power steering compressor, an air conditioning compressor, etc. As shown in FIG. 1, the crankshaft damper 102 is directly coupled to the free end 103 of the crankshaft.

FIG. 2 shows a first embodiment of a damper cover 200 coupled to a damper 210 of a crankshaft 202. In one example, the embodiment shown by FIG. 2 may be included within an engine assembly such as engine assembly 100 shown by FIG. 1, and the crankshaft 202 may be coupled to an engine such as engine 101. The same embodiment of the damper cover 200 and damper 210 is shown in each of FIGS. 2-7. Reference axes 201 are included in each of FIGS. 2-7 for comparison of the perspective views shown by FIGS. 2-7.

The crankshaft 202 includes a first end 206 and a second end 204, with the first end 206 positioned opposite to the second end 204 along an assembly axis 208 of the crankshaft 202. The first end 206 drives wheels of a vehicle in which the crankshaft is installed and the second end 204 is a free end, as described above with reference to FIG. 1. The damper 210 is coupled to the free end 204 and includes a first outer surface 218 (e.g., an outermost planar surface) and a timing ring 216. The first outer surface 218 is a surface exterior to an interior of the damper 210 and is positioned circumferentially about (e.g., around) the assembly axis 208 when the damper 210 is coupled to the crankshaft 202. As shown in FIG. 2, the first outer surface 218 is planar and a line normal to the first outer surface 218 is parallel to the assembly axis 208. Further, the first outer surface 218 faces outward from the crankshaft, in a direction of assembly axis 208.

The assembly axis 208 is an axis extending through an entire length 220 of the crankshaft 202 and is positioned as a central axis of the crankshaft 202. For example, when the engine (such as engine 101 shown by FIG. 1) which includes the crankshaft 202 is operating (e.g., on and running), the assembly axis 208 serves as an axis of rotation of the crankshaft 202 and damper 210. When the damper cover 200 is coupled to the damper 210, the assembly axis 208 may also be an axis of rotation (also referred to as a central axis) of the damper cover 200.

The damper cover 200 includes a frame 214 and an inset 212. The frame 214 and inset 212 are molded together (e.g., formed together and/or permanently coupled) to form the damper cover 200. In one example, the frame 214 may be comprised partially or entirely of one or more rigid materials (e.g., metal) and the inset 212 may be comprised partially or entirely of one or more damping materials (e.g., foam, rubber, etc.). In this way, the frame 214 may interface with and form a strong connection to the damper 210 (as described in further detail below with reference to FIGS. 3-7) while the inset 212 may absorb noise, vibration, and harshness from the engine.

The damper includes a damper first radius 222 corresponding to an outer radius of the outer surface 218, from the assembly axis 208 in a direction perpendicular to the assembly axis 208. Similarly, the damper cover 200 includes a cover radius 224 corresponding to a radius of the damper cover 200 from the assembly axis 208 in a direction perpendicular to a central axis (described below with reference to FIG. 3) of the damper cover 200 (e.g., perpendicular to the assembly axis 208 when the damper cover 200 is coupled to the damper 210). In the embodiment shown by FIGS. 2-7, the damper first radius 222 is greater than the cover radius 224. However, in alternate embodiments (not shown), the cover radius may be greater than the damper first radius (e.g., one or more surfaces of the damper cover may extend beyond the cover radius shown by FIG. 2).

Figure 3:
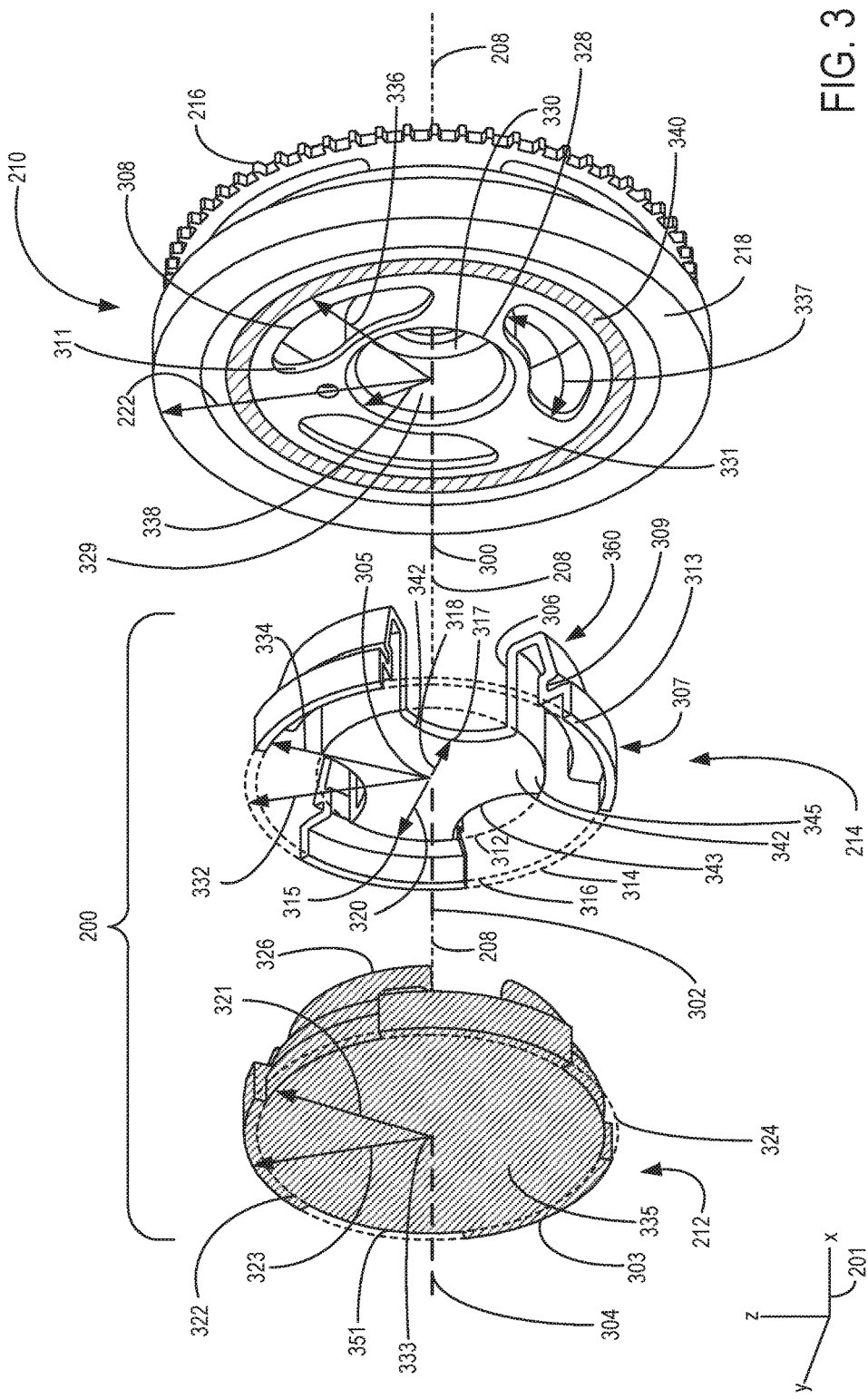
FIG. 3 shows an exploded view of the first embodiment of the damper cover from a first perspective.

FIG. 3 shows the inset 212 and frame 214 of the damper cover 200 in an exploded view from a first perspective, with the inset 212 and frame 214 aligned with the damper 210 along the assembly axis 208. In other words, an inset axis 304 of the inset 212, a frame axis 302 of the frame 214, and a damper axis 300 of the damper 210 are each parallel to the assembly axis 208 and positioned in a same position as (e.g., aligned with) the assembly axis 208. The inset axis 304 is a central axis of the inset 212, the frame axis 302 is a central axis of the frame 214, and the damper axis 300 is a central axis of the damper 210. A "central axis" of a component (such as the inset axis 304 of the inset 212, frame axis 302 of the frame 214, and damper axis 300 of the damper 210) herein refers to an axis which intersects a midpoint of the component and about which a circumference (e.g., perimeter) and radius of the component are arranged. When the damper cover 200 is assembled (e.g., when the inset 212 is molded within and around the frame 214), the inset axis 304 is parallel and aligned with (e.g., in a same position as) the frame axis 302. When assembled in this arrangement (e.g., when the inset axis 304 and frame axis 302 are positioned coaxially relative to each other), the inset axis 304 and frame axis 302 may be referred to collectively as a centerline of the damper cover 200. An axial direction relative to a component (with reference to the components shown by FIGS. 2-7 and described herein) refers to a direction parallel to a central axis of the component (e.g., a direction parallel to the x-axis shown by reference axes 201). A radial direction relative to a component (with reference to the components shown by FIGS. 2-7 and described herein) refers to a direction perpendicular to the axial direction and the central axis of the component and a direction from the central axis of the component to an outer circumference of the component (e.g., along a radius of the component).

A damping layer 340 is included within the damper 210 and is positioned between a second outer surface 331 and the first outer surface 218. The damping layer 340 may be comprised partially or entirely of one or more damping materials (e.g., foam, rubber, etc.) and may reduce NVH of the engine crankshaft (e.g., crankshaft 202 shown by FIG. 2).

The second outer surface 331 (which may herein be referred to as planar slot surface 331) is arranged parallel to the first outer surface 218, but positioned inward of the first outer surface relative to the damper axis 300. The planar slot surface 331 (which may herein be referred to as a planar slot surface) has an outer radius, which is show as damper second radius 336, where the damper second radius 336 is less (e.g., a smaller amount of length) than the damper first radius 222. The planar slot surface 331 also includes an inner radius, which is shown as damper third radius 338. Thus, the planar slot surface 331 is positioned inward of the first outer surface 218 relative to the damper axis 300. The damper 210 also includes a cylindrical cavity 328 formed by a sidewall 329 coupled to the planar slot surface 331. The sidewall 329 extends in a direction parallel to the damper axis 300, away from the planar slot surface 331 and toward the timing ring 216. The sidewall 329 is positioned circumferentially around the damper axis 300 at a distance corresponding to a length of damper third radius 338. The damper third radius 338 is less (e.g., a smaller amount of length) than each of the damper second radius 336 and the damper first radius 222. An inner planar surface 330 of the damper 210 (e.g., a surface coupled to the sidewall 329 and positioned away from the first outer surface 218 along the damper axis 300) may be configured to couple the damper 210 to the crankshaft 202 (shown by FIG. 2) via a bolting apparatus (such as the bolting apparatus 106 shown by FIG. 1). A first end of the bolting apparatus may be inserted into the crankshaft while a second end (e.g., a head) of the bolting apparatus may be coupled to the inner planar surface 330.

In this arrangement, the planar slot surface 331 is positioned away from the inner planar surface 330 and is approximately in-line with (e.g., in a same position along the damper axis 300 as) the first outer surface 218. Each of the damper first radius 222, damper second radius 336, and damper third radius 338 extend outward (e.g., extend away) from the damper axis 300 in directions perpendicular to the damper axis 300. In other words, a tail end of each radius is located along damper axis 300, and the surfaces described by the radii (e.g., first outer surface 218, planar slot surface 331, etc.) are positioned away from the damper axis 300 in directions perpendicular to the damper axis 300.

The planar slot surface 331 includes a plurality of elongate slots 308 (e.g., apertures) positioned within the planar slot surface 331 and oriented circumferentially around the damper axis 300 of the damper 210. Each elongate slot 308 is spaced apart (e.g., located at a distance away) from each other elongate slot 308. The elongate slots 308 have widths that are no greater than a difference between the damper second radius 336 and the damper third radius 338 (e.g., a width of the planar slot surface 331). In one example, opposing ends of each of the elongate slots 308 may be rounded. Each elongate slot 308 is curved along a length 337 of the slot, as it curves around the damper axis 300 about a circumference of the planar slot surface 331. A sidewall 311 of each elongate slot 308 is formed by the planar slot surface 331, in a direction parallel to the damper axis 300, and may be coupled to the damper cover 200, as described further below with reference to FIG. 7. In the embodiment of the damper 210 and damper cover 200 shown by FIGS. 2-7, the damper 210 has three elongate slots 308 arranged within the planar slot surface 331. In alternate embodiments (not shown), the planar slot surface may include an alternate number of elongate slots than three, such as two, four, five, etc.

The frame 214 may be configured with a same number of frame extensions 306 as the number of elongate slots 308. For example, the damper 210 shown by FIG. 3 includes three elongate slots 308. The frame 214 correspondingly includes three frame extensions 306. Each of the frame extensions 306 are positioned along the frame 214 such that each extension aligns with (e.g., is in a same position from the assembly axis as) a separate elongate slot 308 when the frame 214 is coupled to the damper 210 (e.g., when the damper cover 200 is coupled to the damper 210). In other words, the frame extensions 306 extend from a base 345 of the frame 214 in a direction parallel to the frame axis 302 and are configured to be inserted into the elongate slots 308 when the damper cover 200 is coupled to the damper 210. Each frame extension 306 includes an open tab end 307 positioned opposite to a closed guide end 360, with the tab end 307 including an indented surface 309 (which may herein be referred to as an indented locking element or an indentation) adapted to lock around a corresponding elongate slot 308 in order to secure the damper cover 200 to the damper 210, as described further below with reference to FIG. 7. The open tab end 307 of each frame extension 306 is spaced away from the base 345 and the closed guide end 360 of each frame extension 306 connects the open tab end 307 to the base 345.

The frame 214 includes a base surface 342 and the frame axis 302 intersects a midpoint 305 of the base surface 342. The base surface 342 has a first radius 320 and a second radius 318, with the first radius 320 corresponding to a length from the midpoint 305 to an outermost edge 315 of the base surface 342 and the second radius 318 corresponding to a length from the midpoint 305 to an innermost edge 317 of the base surface 342 (e.g., an edge closest to frame axis 302). The base surface 342 is an approximately disc-shaped surface and may include a plurality of openings 343 (e.g., holes) positioned along a first circumference 312 (e.g., a first perimeter) of the base surface 342. In one example, each opening 343 is arranged between two different frame extensions 306 of the frame 214 along the first circumference 312. In other words, in the embodiment shown by FIGS. 2-7, the base surface 342 of the frame 214 is coupled with three frame extensions 306 and includes three openings 343, with each opening 343 positioned between a different corresponding pair of frame extensions 306. Each opening 343 may curve along the base surface 342 between a corresponding pair of frame extensions 306 and towards the frame axis 302. A width of each opening 343 may correspond to a difference in length between the first radius 320 and the second radius 318.

Each frame extension 306 of the frame 214 includes a first tab surface 313 arranged parallel to the base surface 342 and spaced radially away from the base surface 342 (e.g., in a radial direction that is perpendicular to the frame axis 302). In other words, the first tab surfaces 313 are formed by the frame extensions 306 and are positioned circumferentially around the base surface 342 at a distance from the frame axis 302 greater than a length of the first radius 320. A width of each first tab surface 313 may correspond to a length between a third radius 332 and a fourth radius 334, with a length of the fourth radius 334 being greater than the length of the first radius 320 and less than a length of the third radius 332, and the third radius 332 being the length from the midpoint 305 to each first tab surface 313. In other words, an outer edge of each first tab surface 313 is positioned along a circumference 314 (arranged circumferential to the frame axis 302) while an inner edge of each first tab surface 313 is positioned along a circumference 316 (also arranged circumferential to the frame axis 302), with the circumference 314 being greater than the circumference 316.

The inset 212 is shown with a plurality of inset tabs 303 coupled to (and extending outward from, relative to the inset axis 304) an outer surface 335 (e.g., a planar outer surface) of the inset 212. A midpoint 333 of the outer surface 335 is intersected by the inset axis 304 and the inset tabs 303 are arranged around a circumference 322 of the outer surface 335. The circumference 322 of the outer surface 335 is positioned a distance equal to a length of radius 321 around inset axis 304. A width of each inset tab 303 is a length between radius 323 and radius 321. In other words, each inset tab 303 is joined to the outer surface 335 along the circumference 322 and extends in a direction perpendicular to the inset axis 304 towards the circumference 324, with the circumference 324 positioned a distance equal to a length of radius 323 from the inset axis 304. In one example, the width of each inset tab 303 is approximately the same as the width of each first tab surface 313 of the frame 214.

The inset 212 also includes a plurality of inset extensions 326, with each inset extension 326 extending away from the outer surface 335 in a direction parallel to the inset axis 304. Each inset extension 326 is coupled to (e.g., formed by) an inset base 351 of the inset 212 and is positioned circumferentially around the inset axis 304. In one example, each inset extension 326 is arranged between two different inset tabs 303 formed by the inset body 351 of the inset 212 and is configured to align with a corresponding frame extension 306 of the frame 214. In other words, in the embodiment shown by FIGS. 2-7, the inset 212 includes three inset extensions 326 and includes three inset tabs 303, with each inset extension 326 positioned between a different corresponding pair of inset tabs 303.

In the configuration described above, the frame extensions 306 of the frame 214 are positioned to align with the elongate slots 308, and each inset extension 326 is shaped to fit within and surround a portion of a corresponding frame extension 306. By forming the inset 212 and the frame 214 together as the damper cover 200 in this configuration, the frame may provide rigidity and retain a shape of the damper cover 200 while the inset 212 may increase a damping characteristic of the damper 210. Additionally, by aligning the frame extensions 306 with the elongate slots 308 (as described in further detail below with reference to FIG. 4), the damper cover 200 may be coupled to the damper 210 without the use of fasteners (e.g., bolts). In alternate embodiments (not shown), the inset and frame may each include a central aperture positioned and sized to increase an accessibility of the bolting apparatus (as described above) coupled to the damper.

Figure 4:
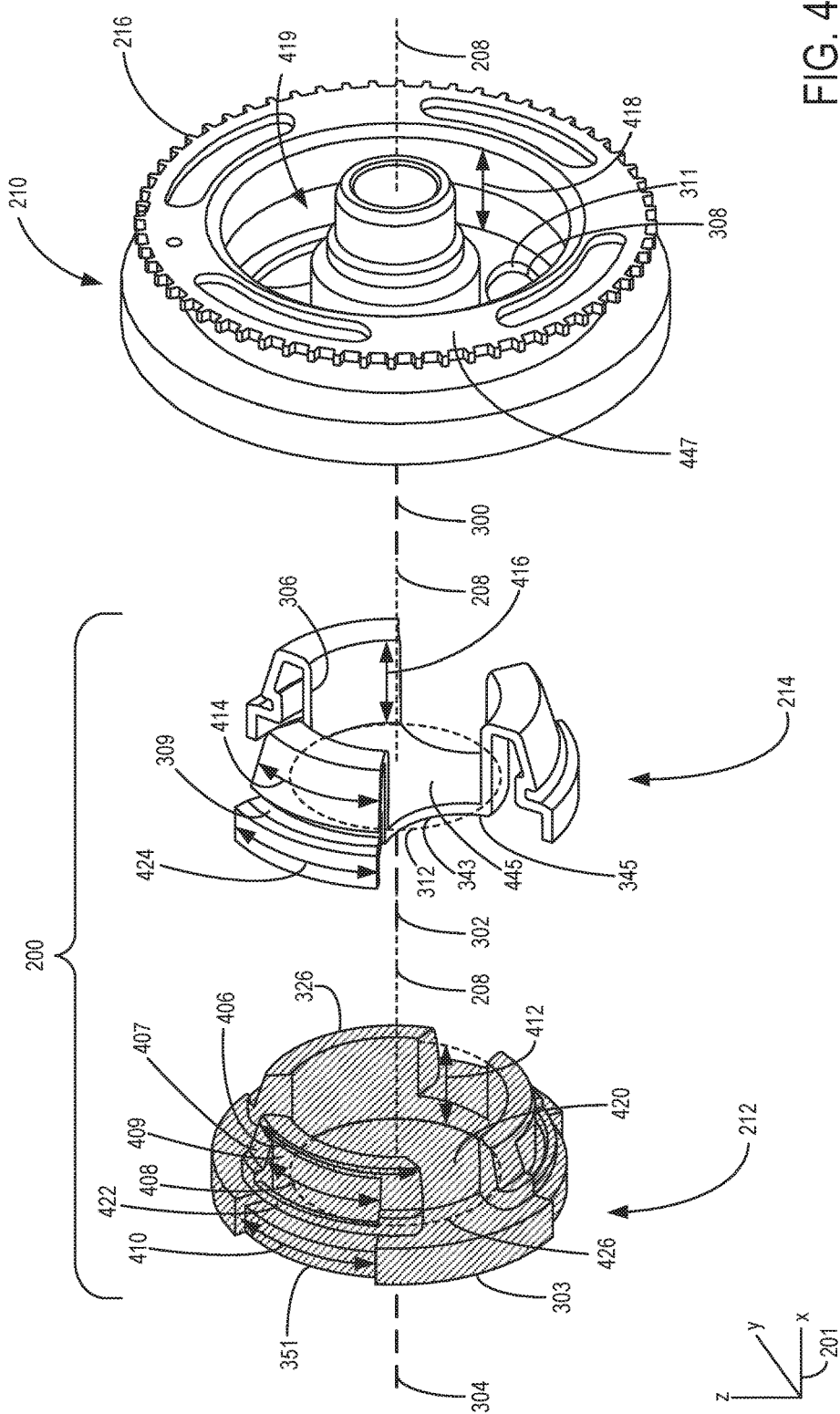
FIG. 4 shows an exploded view of the first embodiment of the damper cover from a second perspective.

FIG. 4 shows the inset 212 and frame 214 of the damper cover 200, along with the damper 210, in an exploded view from a second perspective, with the second perspective approximately perpendicular to the first perspective shown by FIG. 3 as indicated by reference axes 201.

The damper 210 is shown to include an innermost planar surface 447 arranged parallel to the planar slot surface 331 (shown by FIG. 3). The planar slot surface 331 of the damper 210 is positioned closer to the first outer surface 218 of the damper 210 than the innermost planar surface 447 of the damper 210, along the assembly axis 208. In other words, the innermost planar surface 447 is positioned away from the planar slot surface 331 in a direction parallel to the assembly axis 208. The timing ring 216 is coupled to (and formed by) the innermost planar surface 447.

The inset 212 includes an inner surface 420 positioned parallel to the outer surface 335 and opposite to the outer surface 335, in a direction along the inset axis 304. The inner surface 420 has a circumference 426 approximately the same as the first circumference 312 of the base surface 342 of the frame 214. By configuring the inner surface 420 and the base surface 342 with approximately the same circumference, the base surface 342 of the frame 214 is in face-sharing contact with the inner surface 420 of the inset 212 when the frame 214 and the inset 212 are formed together as the damper cover 200. An inner surface 445 of the frame 214 is positioned parallel and opposite to the base surface 342, and is not in face-sharing contact with the inset 212.

A portion of each inset extension 326 of the inset 212 is configured to couple to and fit within a separate frame extension 306 of the frame 214. Each inset extension 326 may partially surround the indented surface 309 of the corresponding frame extension 306 with an inset protrusion 422 formed by the inset 212. In other words, the inset extensions 326 fit within the frame extensions 306 and a portion of the inset extensions 326 (e.g., inset protrusion 422) encapsulates a portion of the frame extensions 306 (e.g., indented surface 309) such that the inset 212 and the frame 214 are permanently coupled together to form the damper cover 200.

Each inset extension 326 includes an indented surface 409 (e.g., an indentation). The indented surface 409 is formed by the surfaces of the frame extension 306 (as described in further detail below with reference to FIG. 7). The indented surface 409 is surrounded by a second surface 407 of the inset extension 326, with the second surface 407 having an arc length 406 greater than the arc length 408. As a result, the arc length 406 of the inset 212 is also greater than an arc length 414 of the frame 214.

When the inset 212 and the frame 214 are coupled together to form the damper cover 200, a portion of each inset extension 326 is positioned outside of the corresponding frame extension 306 in a direction around (e.g., arcing around) the inset axis 304 and frame axis 302 due to the arc length 406 being greater than the arc length 414. The arc length 406 may be approximately a same length as the slot length 337 (shown by FIG. 3) of the elongate slots 308, but may be decreased by an amount relative to the slot length 337 so that the inset extensions 326 may be inserted into the elongate slots 308. Additionally, the arc length 414 is less than (e.g., a decreased amount of length) relative to an arc length 424. In other words, the tab end 307 of each frame extension 306 around the frame axis 302 is longer than the guide end 360 of each frame extension 306 around the frame axis 302. By configuring the frame extensions 306 in this way, the frame 214 (and therefore the damper cover 200) may be more easily inserted into the damper 210. The reduced arc length 424 of the guide end 360 of each frame extension 306 relative to the arc length 414 of the tab end 307 increases an ease with which each frame extension 306 may be inserted into the elongate slots 308. For example, as the damper cover 200 is inserted into the damper 210, the arc length 424 of each guide end 360 is configured to fit within the slot length 337 of a corresponding elongate slot 308 and align the damper cover 200 with the damper 210. The arc length 424 of each guide end 360 is decreased relative to the arc length 414 of each tab end 307 (e.g., each frame extension 306 tapers in arc length from the corresponding tab end 307 to the corresponding guide end 360) so that each frame extension 306 more readily fits within the corresponding elongate slot 308. In other words, each frame extension 306 narrows, in a circumferential direction (e.g., around the assembly axis 208), from the tab end 307 to the guide end 360. In this way, an ease of installation of the damper cover 200 into the damper 210 is increased.

Each inset extension 326 extends for a length 412 in a direction parallel to the inset axis 304 and extending away from both of the inner surface 420 and the outer surface 335. The frame extensions 306 also have a length 416 in a direction parallel to the frame axis 302 and extending away from the base surface 342. The length 412 and the length 416 are configured such that each inset extension 326 fits within a corresponding frame extension 306 in a direction parallel to the assembly axis 208 when the inset 212 is coupled to the frame 214 (e.g., when the inner surface 420 of the inset 212 is in face-sharing contact with the base surface 342). Additionally, the frame extensions 306 may be configured so that the length 416 is less than a length 418 of an interior 419 of the damper 210 in a direction parallel to the damper axis 300. By configuring the lengths this way, the frame extensions 306 and inset extensions 326 may fit within the interior 419 of the damper 210 when the damper cover 200 is coupled to the damper 210, as described in further detail below with reference to FIG. 7.

Each of the inset tabs 303 are separated from one another around circumference 324 (e.g., each inset tab 303 is separated from each adjacent inset tab 303) by arc length 410, and each arc length 410 may be approximately the same (e.g., a same amount of length) as arc length 424 of each frame extension 306. In other words, as shown by FIG. 3, a length between each inset tab 303 along circumference 322 may be approximately the same as a length of each frame extension 306 along circumference 316, and a length between each inset tab 303 along circumference 324 may be approximately the same as a length of each frame extension 306 along circumference 314. In alternate embodiments (e.g., embodiments in which the elongate slots 308 of the damper 210 are positioned asymmetrically around the damper axis 300), the lengths between each inset tab may not be the same, and the lengths between each frame extension may not be the same. However, each length between adjacent inset tabs may match (e.g., be approximately a same length as) each corresponding length between frame extensions.

Figure 5:
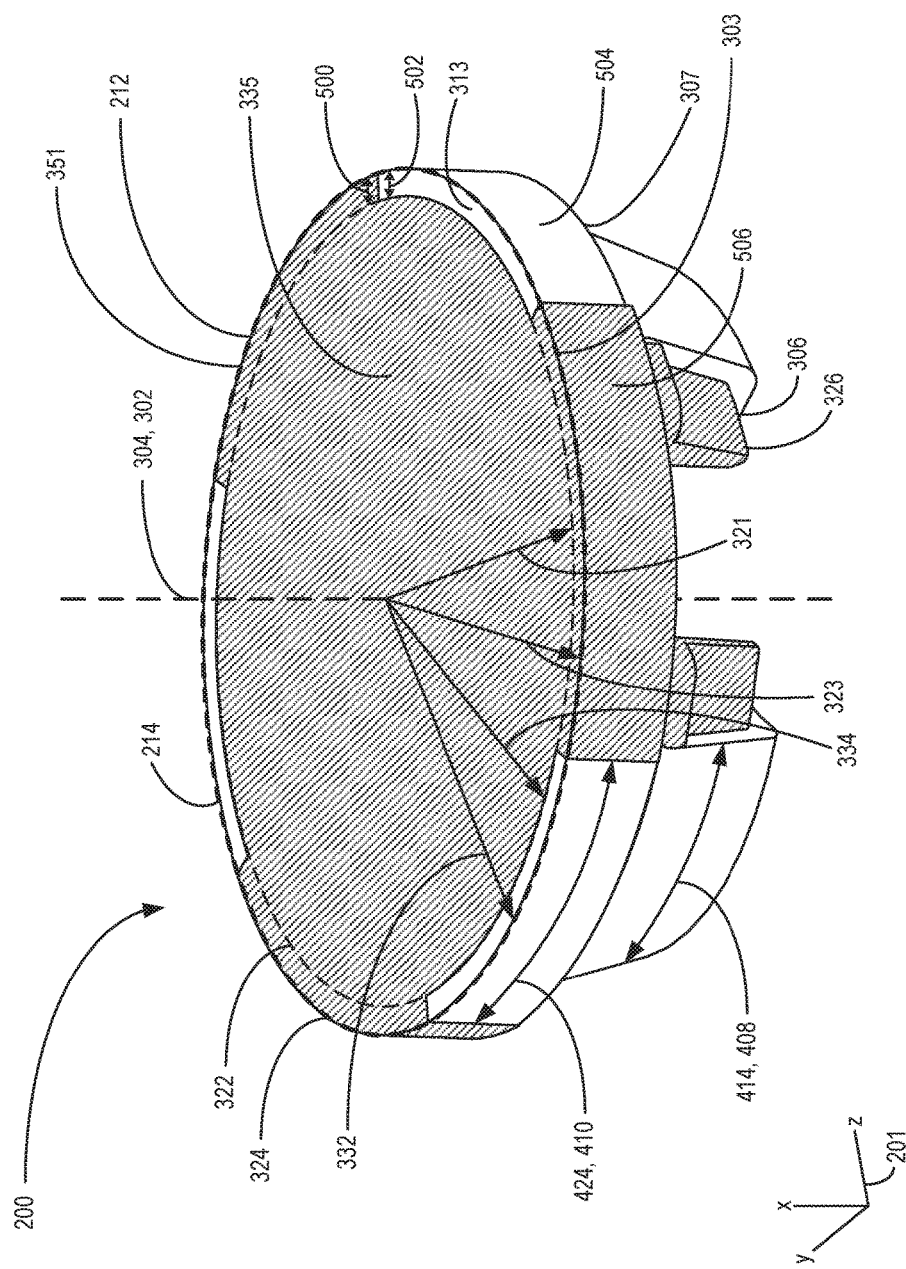
FIG. 5 shows an assembled view of the first embodiment of the damper cover from a first perspective.

By configuring the arc length 410 between each pair of inset tabs 303 to match the arc length 424 of each frame extension 306, a portion of each frame extension 306 (e.g., a portion including first tab surface 313) fits within the space between each pair of adjacent inset tabs 303 when the inset 212 and frame 214 are assembled to form the damper cover 200 as shown by FIG. 5 and described below.

FIG. 5 shows a perspective view of the frame 214 and the inset 212 assembled together (e.g., formed together) as the damper cover 200. As described above with reference to FIGS. 3-4, when the damper cover 200 is assembled, the frame axis 302 and the inset axis 304 are parallel and aligned coaxially (e.g., locations along inset axis 304 are also locations along frame axis 302).

Each frame extension 306 is shown in face-sharing contact with surfaces of the inset 212. For example, the first tab surface 313 has a width 502 approximately the same as a width 500 of each inset tab 303 (e.g., a width in the radial direction) and is configured to fit within a space between each inset tab 303 along the circumference 324 of the inset 212. In other words, the arc length 410 between each inset tab 303 is approximately the same as the arc length 424 along a second tab surface 504 of each frame extension 306. The first tab surface 313 of each frame extension 306 is arranged flush with (e.g., parallel and coplanar with) the outer surface 335, and the second tab surface 504 of each frame extension 306 is arranged flush with (e.g., matching a curvature of) inset surface 506 along circumference 524.

Figure 6:
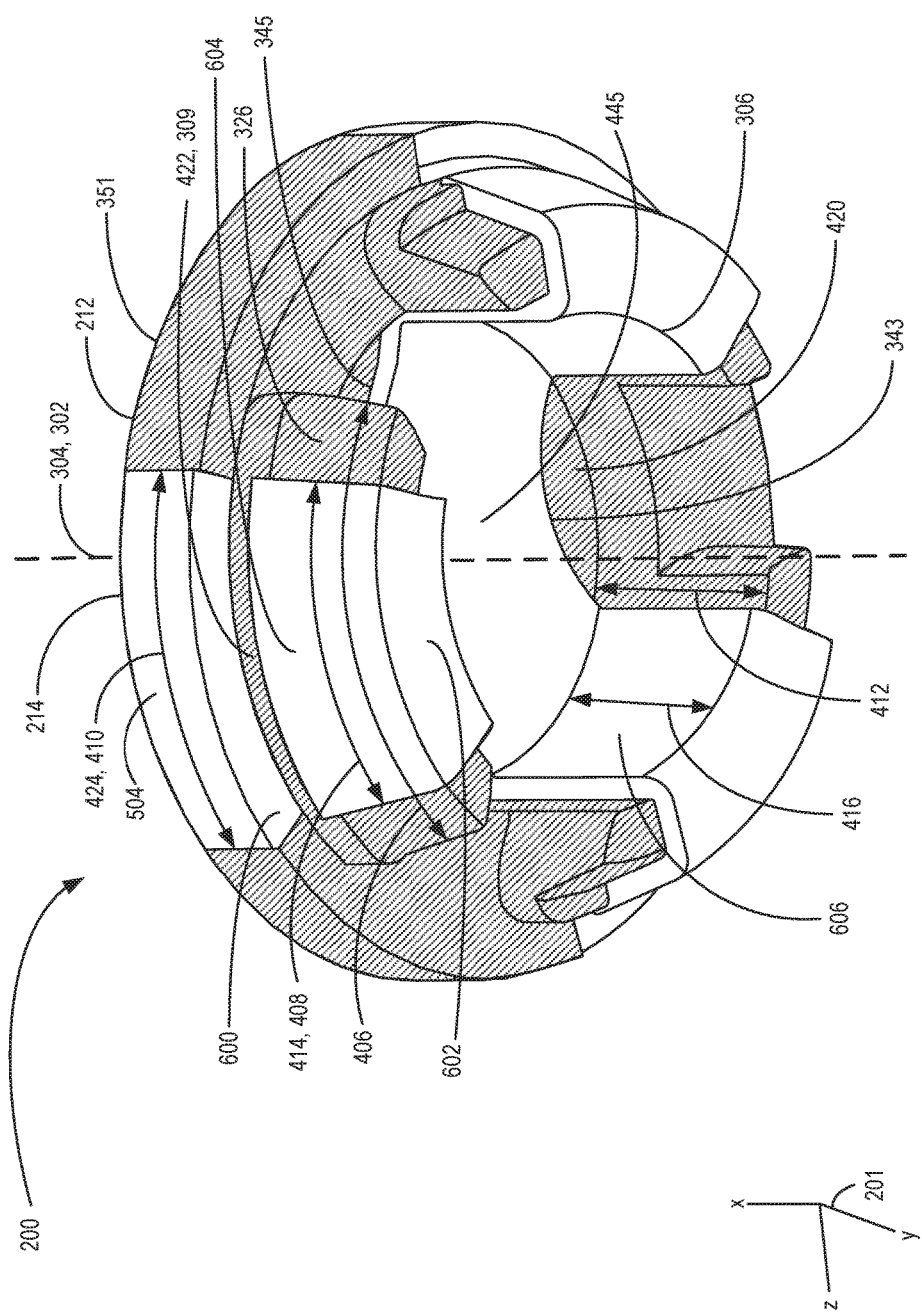
FIG. 6 shows an assembled view of the first embodiment of the damper cover from a second perspective.

FIG. 6 shows another perspective view of the damper cover 200, with the view of the damper cover 200 rotated relative to the view shown by FIG. 5 (as indicated by reference axes 201).

Each frame extension 306 of the frame 214 includes the first tab surface 313 (described above with reference to FIG. 3 and FIG. 5), the second tab surface 504 (described above with reference to FIG. 5), a third tab surface 600, a fourth tab surface 604, a fifth tab surface 602, and a sixth tab surface 606. The third tab surface 600 of each frame extension 306 is coupled to the second tab surface 504, is arranged approximately perpendicular to the second tab surface 504, and forms a portion of the indentation 309. The fourth tab surface 604 surrounds the indented surface 409 of the inset 212 and is positioned along the second surface 407 of the inset extension 326. The fifth tab surface 602 is arranged approximately perpendicular to the second tab surface 504 and parallel to the first tab surface 313, and is coupled to the fourth tab surface 604. The sixth tab surface 606 is coupled to the inner surface 445 and the fifth tab surface 602. The sixth tab surface 606 is arranged perpendicular to the inner surface 445 and extends between the inner surface 445 and the fifth tab surface 602. Each of these surfaces (e.g., first tab surface 313, second tab surface 504, third tab surface 600, fourth tab surface 604, fifth tab surface 602, and sixth tab surface 606) are described in further detail below with reference to FIG. 7.

Each inset extension 326 of the inset 212 extends into a space formed between the surfaces described above of the corresponding frame extension 306 (e.g., a portion of each inset extension 326 fits within the tab end 307 and the guide end 360 of the corresponding frame extension 306). While the frame extensions 306 of the frame 214 are shown partially surrounding the inset extensions 326 of the inset 212, a portion of the inset 212 is also shown partially surrounding the frame 214 along each indentation 309 of the frame extensions 306. In this configuration, the inset 212 and the frame 214 are permanently coupled together and form the damper cover 200. Each inset protrusion 422 of the inset 212 surrounding each indentation 309 may further reduce NVH from the engine crankshaft (e.g., crankshaft 202 shown by FIG. 2) by coupling to the damper as shown by FIG. 7 and described in further detail below.

FIG. 7 shows a cross-sectional view of the damper cover 200 coupled to the damper 210. Specifically, the frame extensions 306 of the frame 214 and the inset extensions 326 of the inset 212 are shown inserted into the elongate slots 308 of the damper 210 and coupled to the surfaces of the damper 210. The frame extensions 306 and inset extensions 326 of the damper cover 200 are configured such that a length 718 of the damper cover 200 fits within each elongate slot 308, and the damper cover 200 does not contact an inner surface 701 (e.g., a surface of the elongate slot closest to the damper axis 300) of each sidewall 311 of each elongate slot 308. However, a portion of the damper cover 200 does contact an outer surface 703 (e.g., a surface of the elongate slot arranged opposite to the inner surface 701) of each sidewall 311. The surfaces of the damper cover 200 proximate to each elongate slot 308 (when the damper cover 200 is coupled to the damper 210) are described below.

The frame 214 of the damper cover 200 includes the base surface 342 and the inner surface 445. The inner surface 445 is parallel to the base surface 342 and is arranged perpendicular to the assembly axis 208 when the damper cover 200 is coupled to the damper 210. Each of the frame extensions 306 and inset extensions 326 are inserted through the elongate slots 308 of the damper 210.

The sixth tab surface 606 is coupled to the inner surface 445 and arranged approximately parallel to the assembly axis 208. The sixth tab surface 606 does not contact the inner surface 701 of the sidewall 311 while the damper cover 200 is coupled to the damper 210. The sixth tab surface 606 extends in a direction approximately parallel to the assembly axis 208 and opposite to the outer surface 335. The fifth tab surface 602 is coupled to the sixth tab surface 606 and is arranged perpendicular to the fifth tab surface 602. The fifth tab surface 602 extends away from the assembly axis 208. The fourth tab surface 604 is coupled to the fifth tab surface 602 and is arranged at a first angle 708 relative to the fifth tab surface 602. The fourth tab surface 604 extends from the fifth tab surface 602 in a direction toward the first tab surface 313 (e.g., in a direction away from the assembly axis 208 and toward the outer surface 335). The fourth tab surface 604 extends for a length 709 in a direction parallel to the assembly axis 208 that is less than a length 707 of the sixth tab surface 606 in the same direction. The entirety of the fourth tab surface 604 is positioned within the interior 419 of the damper 210 when the damper cover 200 is coupled to the damper 210.

The fourth tab surface 604 is additionally coupled to a seventh tab surface 710, with the seventh tab surface 710 arranged parallel to the fifth tab surface 602 and extending in a direction toward the assembly axis 208. In this arrangement, the fourth tab surface 604 (angled relative to the fifth tab surface 602) extends between the fifth tab surface 602 and the seventh tab surface 710. The length 718 in a direction parallel to the base surface 342 from the sixth tab surface 606 to a location where the fourth tab surface 604 couples to the seventh tab surface 710 is less than a length 717 between the outer surface 703 and the inner surface 701 of the elongate slot 308. The seventh tab surface 710 is coupled to the third tab surface 600 by the eighth tab surface 713. The eighth tab surface 713 is arranged parallel to the assembly axis 208 and extends between the seventh tab surface 710 and the third tab surface 600. In other words, the indentation 309 is formed by the coupling of the seventh tab surface 710 to the third tab surface 600 via the eighth tab surface 713. The third tab surface 600 is arranged parallel to the seventh tab surface 710 and extends in a direction away from the assembly axis 208. The second tab surface 504 is arranged perpendicular to the third tab surface 600 and extends toward the outer surface 335 in a direction parallel to the assembly axis 208. The second tab surface 504 is coupled to the first tab surface 313, with the first tab surface 313 arranged parallel to the outer surface 335 and flush with the outer surface 335 (as described above with reference to FIG. 5).

The tab end 307 of each frame extension 306 is adapted to lock around a corresponding elongate slot 308 of the damper 210 via the indentation 309 (formed by the third tab surface 600, seventh tab surface 710, and eighth tab surface 713 as described above). For example (as described below), a compressive force may compress each tab end 307 as the damper cover 200 is inserted into the damper 210, and when the compressive force is released, the surfaces of the indentation 309 (as described above) of each tab end 307 are configured to surround the sidewall 311 of a corresponding elongate slot 308. A portion of the inset 212 is positioned within each indentation 309 in order to reduce an amount of contact between the each indentation 309 and each corresponding sidewall 311, as described below.

The inset protrusion 422 of the inset 212 is positioned within the indentation 309 (e.g., the groove within the frame extension 306 formed by the seventh tab surface 710, eighth tab surface 713, and third tab surface 600). The inset protrusion 422 fills an entirety of the indentation 309 and is arranged to couple with and contact the outer surface 703 of the elongate slot 308 when the damper cover 200 is coupled to the damper 210. The inset protrusion 422 may reduce NVH from the engine crankshaft (e.g., crankshaft 202 shown by FIG. 2) when the inset protrusion 422 is coupled to the outer surface 703 of elongate slot 308. For example, vibrations from the crankshaft may result in vibrations of the damper 210. By arranging the damper cover 200 within the damper 210 such that the inset protrusion 422 is directly coupled (e.g., in face-sharing contact) with the outer surface 703 of the elongate slot 308 and positioned between the outer surface 703 and the indentation 309 of the frame extension 306, the inset protrusion 422 may reduce a vibration of the damper cover 200 caused by vibration of the damper 210. Additionally, by configuring the length 718 to be less than the length 717, a space (e.g., a gap) is created between the sixth tab surface 606 and the inner surface 701 of the elongate slot 308. This may also reduce a vibration of the damper cover 200 resulting from vibration of the damper 210 by reducing an amount of the frame 214 that is in direct contact (e.g., face-sharing contact) with the surfaces of the damper 210.

In order to insert the damper cover 200 into the damper 210, the damper cover 200 is compressed in a direction perpendicular to the assembly axis 208 and toward the assembly axis 208. For example, as the fifth tab surface 602 of the frame extension 306 is inserted through the elongate slot 308, the fourth tab surface 604 guides the frame extension 306 into the interior 419 of the damper 210 due to the first angle 708 between the fifth tab surface 602 and the fourth tab surface 604. In other words, the fourth tab surface 604 contacts the outer surface 703 of the elongate slot 308 as an insertion force (e.g., insertion force 721) is applied to the damper cover 200 in a direction approximately parallel to the assembly axis 208 and toward the damper 210. The insertion force 721 and the contact between the fourth tab surface 604 and the outer surface 703 of the elongate slot 308 results in a compressive force 723 from the outer surface 703 against the fourth tab surface 604. The compressive force 723 pushes the frame extension 306 toward the assembly axis 208 (e.g., engages the outer surface 703 with the fourth tab surface 604) as the damper cover 200 is inserted into the damper 210. The compressive force 723 is applied to the fourth tab surface 604 until the frame extension 306 is inserted to a depth (indicated by axis 725) within the interior 419 of the damper 210 at which the seventh tab surface 710 is entirely positioned within the interior 419. The fourth tab surface 604 then disengages with (e.g., no longer contacts) the outer surface 703 and the compressive force 723 against the fourth tab surface 604 is redirected against the inset protrusion 422. In other words, when the damper cover 200 is inserted into the damper 210 to a depth at which the fourth tab surface 604 no longer contacts the outer surface 703, the frame extension 306 springs back from its previously compressed position (e.g., compressed towards the assembly axis 208). In this position, the indentation 309 acts as a locking element, with the inset protrusion 422 forming an interface between the indentation 309 and the outer surface 703. A restoring force (e.g., a force in a direction opposite to the compressive force 723) of the frame extension 306 presses (e.g., clamps) the inset protrusion 422 into the outer surface 703 of the elongate slot 308 and couples the damper cover 200 to the damper 210. In this position, the damper cover 200 is securely coupled (e.g., locked) to the damper 210.

By coupling the damper cover 200 to the damper 210 in the configuration described above with reference to FIGS. 2-7, an amount of the frame 214 that is in contact with the damper 210 may be reduced and an amount of the inset 212 in contact with the damper 210 may be increased. For example, by positioning each inset protrusion 422 between the corresponding outer surfaces 703 of the elongate slots 308 and the indented surfaces 309 of the frame 214, the frame 214 does not contact the outer surfaces 703. In this way, noise, vibration, and harshness resulting from contact between the frame 214 and the damper 210 is reduced. As a result, the frame 214 increases a rigidity of the damper cover 200 so that the damper cover 200 may be easily installed into the damper 210 and securely coupled to the damper 210, while the inset 212 increases a noise, vibration, and harshness reducing characteristic of the damper cover 200.

FIG. 8 shows a second embodiment of a damper cover (e.g., damper cover 800) and damper (e.g., damper 810) coupled to an end of a crankshaft of an engine. In one example, the embodiment shown by FIG. 8 may be included within an engine assembly such as engine assembly 100 shown by FIG. 1, and crankshaft 802 may be coupled to an engine such as engine 101. The same embodiment of the damper cover 800 and damper 810 is shown in each of FIGS. 8-12. Reference axes 801 are included in each of FIGS. 8-12 for comparison of the perspective views shown by FIGS. 8-12.

The crankshaft 802 includes a first end 806 and a second end 804, with the first end 806 positioned opposite to the second end 804 along an assembly axis 808 of the crankshaft 802. The first end 806 drives wheels of a vehicle in which the crankshaft is installed and the second end 804 is a free end as described above with reference to FIG. 1. Damper 810 is coupled to the free end 804 by a bolting apparatus 803 and includes a first outer surface 818 (e.g., an outermost planar surface) and a timing ring 816. The first outer surface 818 is a surface exterior to an interior of the damper 810 and is positioned circumferentially around the assembly axis 808 when the damper 810 is coupled to the crankshaft 802. In other words, when the damper 810 is coupled to the crankshaft 802 the first outer surface 818 is arranged radially relative to the assembly axis 808.

The assembly axis 808 is an axis extending through an entire length 820 of the crankshaft 802 and is positioned as a central axis (e.g., a central axis as described above with reference to FIG. 3) of the crankshaft 802. For example, when the engine (such as engine 101 shown by FIG. 1) which includes the crankshaft 802 is operating (e.g., on and running), the assembly axis 808 serves as an axis of rotation of the crankshaft 802 and damper 810. When the damper cover 800 is coupled to the damper 810, the assembly axis 808 may also be an axis of rotation of the damper cover 800.

An axial direction relative to a component (with reference to the components shown by FIGS. 8-12 and described herein) refers to a direction parallel to a central axis of the component (e.g., a direction parallel to the x-axis shown by reference axes 801). A radial direction relative to a component (with reference to the components shown by FIGS. 8-12 and described herein) refers to a direction perpendicular to the axial direction and the central axis of the component and a direction from the central axis of the component to an outer circumference of the component (e.g., along a radius of the component).

The damper cover 800 includes a frame 814 and an inset 812. The frame 814 and inset 812 are molded together (e.g., permanently coupled) to form the damper cover 800. In one example, the frame 814 may be comprised partially or entirely of one or more rigid materials (e.g., metal) and the inset 812 may be comprised partially or entirely of one or more damping materials (e.g., foam, rubber, etc.). In this way, the damper cover 800 may interface with and form a strong connection to the damper 810 (as described in further detail below with reference to FIGS. 9-12) while the inset 812 may absorb noise, vibration, and harshness from the engine.

The damper 810 has a damper first radius 822 corresponding to an outer radius of the outer surface 818 in a direction perpendicular to the assembly axis 808. Similarly, the damper cover 800 has a cover radius 824 corresponding to a length of the damper cover 800 in a direction perpendicular to a central axis (e.g., radial direction, as described below with reference to FIG. 9) of the damper cover 800 (e.g., perpendicular to the assembly axis 808 when the damper cover 800 is coupled to the damper 810). In the embodiment shown by FIGS. 8-12 the damper first radius 822 is greater than the cover radius 824. However, in alternate embodiments (not shown), the cover radius may be greater than the damper first radius (e.g., one or more surfaces of the damper cover may extend beyond the cover radius).

Figure 9:
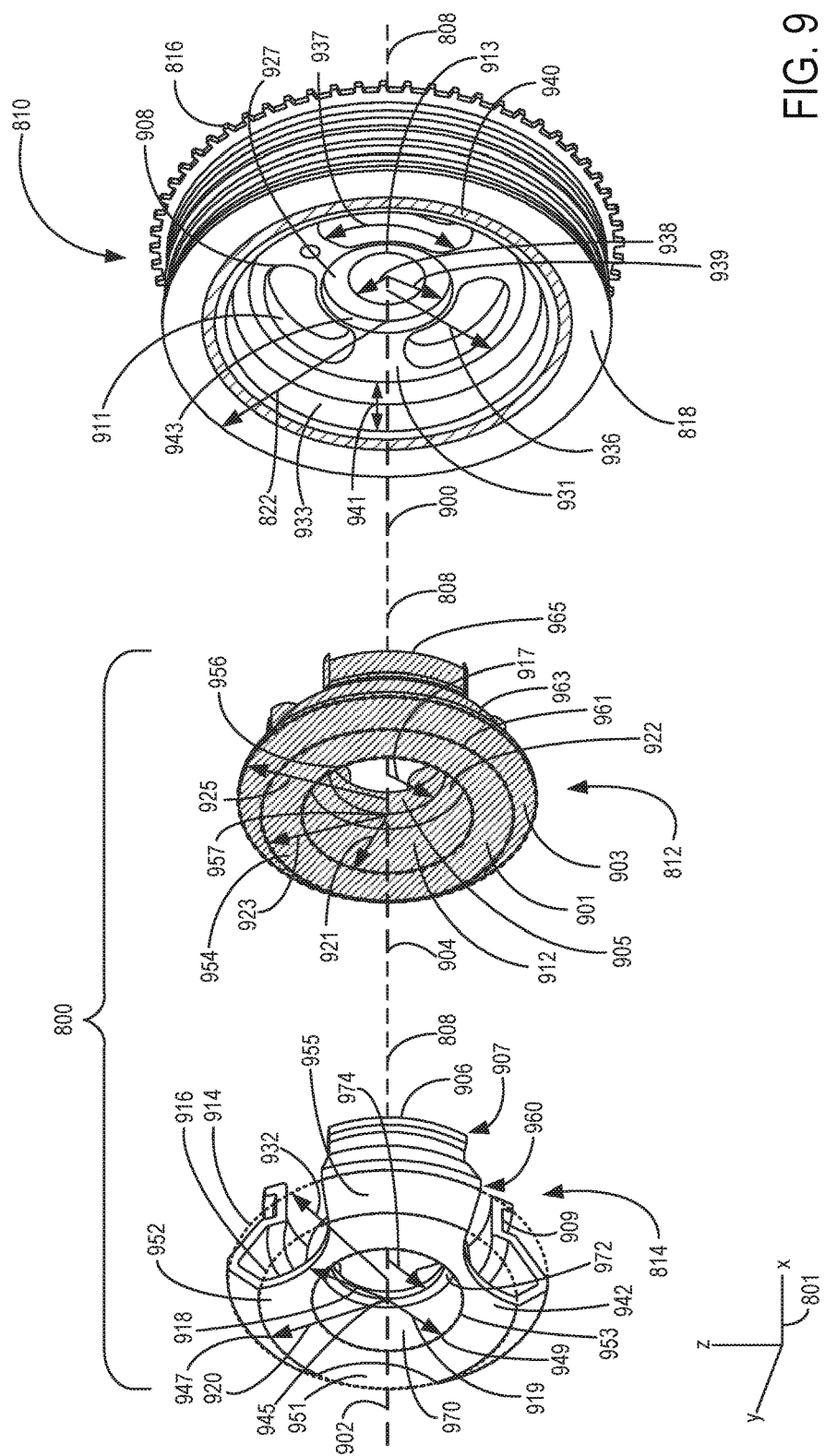
FIG. 9 shows an exploded view of the second embodiment of the damper cover from a first perspective.

FIG. 9 shows the inset 812 and frame 814 of the damper cover 800 in an exploded view from a first perspective, with the inset 812 and frame 814 aligned with the damper 810 along the assembly axis 808. In other words, an inset axis 904 of the inset 812, a frame axis 902 of the frame 814, and a damper axis 900 of the damper 810 are each parallel to the assembly axis 808 and positioned in a same position as the assembly axis 808. The inset axis 904 is a central axis of the inset 812, the frame axis 902 is a central axis of the frame 814, and the damper axis 900 is a central axis of the damper 810. When the damper cover 800 is assembled (e.g., when the inset 812 is molded within and around the frame 814) the inset axis 904 is parallel and aligned with the frame axis 902. When assembled in this arrangement (e.g., when the inset axis 904 and frame axis 902 are positioned coaxially relative to each other), the inset axis 904 and frame axis 902 may be referred to collectively as a centerline of the damper cover 800.

The damper 810 includes a second outer surface 931 (which may herein be referred to as planar slot surface 931) positioned approximately parallel to the first outer surface 818 and depressed into the damper 810 relative to the first outer surface 818. The planar slot surface 931 is positioned inward of the first outer surface 818 relative to the damper axis 900. The planar slot surface 931 is also positioned parallel to an innermost planar surface (shown by FIG. 10 and described below) of the damper 810, and is positioned closer to (e.g., a smaller amount of distance from) the innermost planar surface than the first outer surface 818. The planar slot surface 931 is positioned a distance 941 away from the first outer surface 818 in a direction parallel to the damper axis 900 and towards the timing ring 816. The first outer surface 818 and the planar slot surface 931 are coupled (e.g., joined together) by a first sidewall 933 of the damper 810. The planar slot surface 931 has a damper second radius 936, with the damper second radius 936 being less (e.g., a smaller amount of length) than the damper first radius 822. The planar slot surface 931 is coupled to a second sidewall 943 which is arranged perpendicular to the planar slot surface 931 and extends away from the planar slot surface 931 and first outer surface 818 in a direction parallel to the damper axis 900. The second sidewall 943 is coupled to a planar surface 927 (e.g., an inner planar surface) arranged parallel to the planar slot surface 931 with a radius 939. The planar surface 927 is positioned away from the planar slot surface 931 and first outer surface 818 along the damper axis 900. In other words, the planar slot surface 931 is coupled to the planar surface 927 via second sidewall 943, and the planar slot surface 931 and planar surface 927 are parallel to each other.

The planar surface 927 is coupled to a cylindrical cavity 913 extending parallel to the damper axis 900 in a direction away from the planar slot surface 931. The cylindrical cavity 913 is partially formed by the planar surface 927. In other words, the cylindrical cavity 913 is directly coupled (e.g., joined) to the planar surface 927. The cylindrical cavity 913 has a damper third radius 938 in a direction perpendicular to the damper axis 900. The damper third radius 938 is less than both of the damper second radius 936 and the damper first radius 822. In one example, the cylindrical cavity 913 may be configured to couple the damper 810 to the crankshaft 802 via the bolting apparatus 803 (both shown by FIG. 8) by coupling the bolting apparatus to the planar surface 927 of the damper 810. In alternate embodiments (not shown) of the damper cover 800 and damper 810, the inset and frame may each include a central aperture positioned and sized to increase an accessibility of the bolting apparatus (as described above) coupled to the damper.

In this arrangement, the planar slot surface 931 is positioned between the planar surface 927 and the first outer surface 818 and extends in a direction perpendicular (e.g., radial) to the damper axis 900. The cylindrical cavity 913, planar slot surface 931, and first outer surface 818 are positioned such that the damper axis 900 intersects each of the damper first radius 822, damper second radius 936, and damper third radius 938. When the damper 810 is coupled to the crankshaft (e.g., crankshaft 802 shown by FIG. 8), the assembly axis 808 also intersects the damper first radius 822, damper second radius 936, and damper third radius 938.

A damping layer 940 is included within the damper 810 and is positioned between the planar slot surface 931 and the first outer surface 818 in a direction perpendicular to the damper axis 900. The damping layer 940 may be comprised partially or entirely of one or more damping materials (e.g., foam, rubber, etc.) and may reduce NVH of the engine crankshaft (e.g., crankshaft 802 shown by FIG. 8).

The planar slot surface 931 includes a plurality of elongate slots 908 (e.g., apertures) positioned within the planar slot surface 931 and oriented circumferentially around the damper axis 900 of the damper 810 and spaced apart from one another. The elongate slots 908 have widths that are no greater than a length between the damper second radius 936 and the damper third radius 938. In one example, opposing ends of each of the elongate slots 908 may be rounded. Each elongate slot 908 is curved along a length 937 of the slot, as it curves around the damper axis 900 about a circumference of the planar slot surface 931. A sidewall 911 of each elongate slot 908 is formed by the planar slot surface 931 and may be coupled by the damper cover 800 as described further below with reference to FIGS. 11-12. In the embodiment of the damper 810 and damper cover 800 shown by FIGS. 8-12, the damper 810 has three elongate slots 908 arranged in the planar slot surface 931. In alternate embodiments (not shown), the planar slot surface may include an alternate number of elongate slots than three, such as two, four, five, etc.

The frame 814 may be configured with a same number of frame extensions 906 as the number of elongate slots 908. For example, the damper 810 is shown by FIG. 9 with three elongate slots 908. The frame 814 correspondingly is shown with three frame extensions 906. Each of the frame extensions 906 are positioned along the frame 814 such that each extension aligns with a separate elongate slot in a direction parallel to the assembly axis 808 when the frame is coupled to the damper (e.g., when the damper cover is coupled to the damper). In other words, the frame extensions 906 extend from the frame 814 in a direction parallel to the frame axis 902 and are configured to be inserted into the elongate slots 908 when the damper cover is coupled to the damper 810. Each frame extension 906 includes an open tab end 907 positioned opposite to a closed guide end 960, with the tab end 907 including an indentation 909 in order to secure the damper cover 800 to the damper 810 as described further below with reference to FIGS. 11-12. In contrast to the embodiment of the damper cover 200 shown by FIGS. 2-7 which includes the tab end 307 positioned proximate to the base 345 of the frame 214 and the guide end 360 positioned away from the base 345 of the frame 214, the damper cover 800 shown by FIGS. 8-12 includes the tab end 907 positioned away from a frame base 952 of the frame 814 and the guide end 960 positioned proximate to the frame base 952 of the frame 814.

The frame base 952 of the frame 814 includes a base surface 942 (e.g., an outermost planar surface) and the frame axis 902 intersects a midpoint 945 of the base surface 942. The base surface 942 has a first radius 920 and a second radius 919, with the first radius 920 corresponding to a length from the midpoint 945 to an outer edge 947 of the base surface 942 and the second radius 919 corresponding to a length from the midpoint 945 to an inner edge 949 of the base surface 942 (e.g., an edge relatively closer to frame axis 902 than outer edge 947). The base surface 942 is an approximately ring-shaped (e.g., annular) surface and may include a plurality of openings (e.g., holes) positioned between an inner circumference 953 (e.g., a perimeter along the base surface 942 nearest to the frame axis 902) and an outer circumference 916 (e.g., a perimeter along the base surface 942 further from the frame axis 902 relative to the inner circumference 952) of the base surface 942. In one example, each opening 951 is arranged between two different frame extensions 906 of the frame 814 (e.g., a separate opening 951 is arranged between each pair of frame extensions 906). In the embodiment shown by FIGS. 8-12, the base surface 942 of the frame 814 is coupled with three frame extensions 906 and includes three openings 951, with each opening 951 positioned between a different corresponding pair of frame extensions 906. Each opening 951 may curve along the base surface 942, with an edge of each opening nearest to the frame axis 902 curving toward the frame axis 902. A width of each opening 951 may correspond to a length between a radius 918 and the radius 920, with the radius 920 corresponding to a distance from the midpoint 945 to the outer circumference 916, and the radius 918 corresponding to a distance from the midpoint 945 to a location along the base surface 942 between the inner circumference 953 and the outer circumference 916.

The base surface 942 is coupled to a frame sidewall 970 of the frame 814. The frame sidewall 970 is arranged perpendicular to the base surface 942 and parallel to the frame axis 902. The frame sidewall 970 extends away from the base surface 942 in a direction parallel to the frame axis 902 and couples to a frame inner surface 972. The frame inner surface 972 is arranged parallel to the base surface 942 and is positioned circumferentially around the frame axis 902. The frame inner surface 972 is positioned along the frame sidewall 970 and extends toward the frame axis 902 to radius 974, with the radius 974 being smaller (e.g., a decreased amount of length) relative to the second radius 919. The frame sidewall 970 and frame inner surface 972 are adapted to fit within an inner circumference 956 (e.g., an inner perimeter) of the inset 812 as described below.

Figure 10:
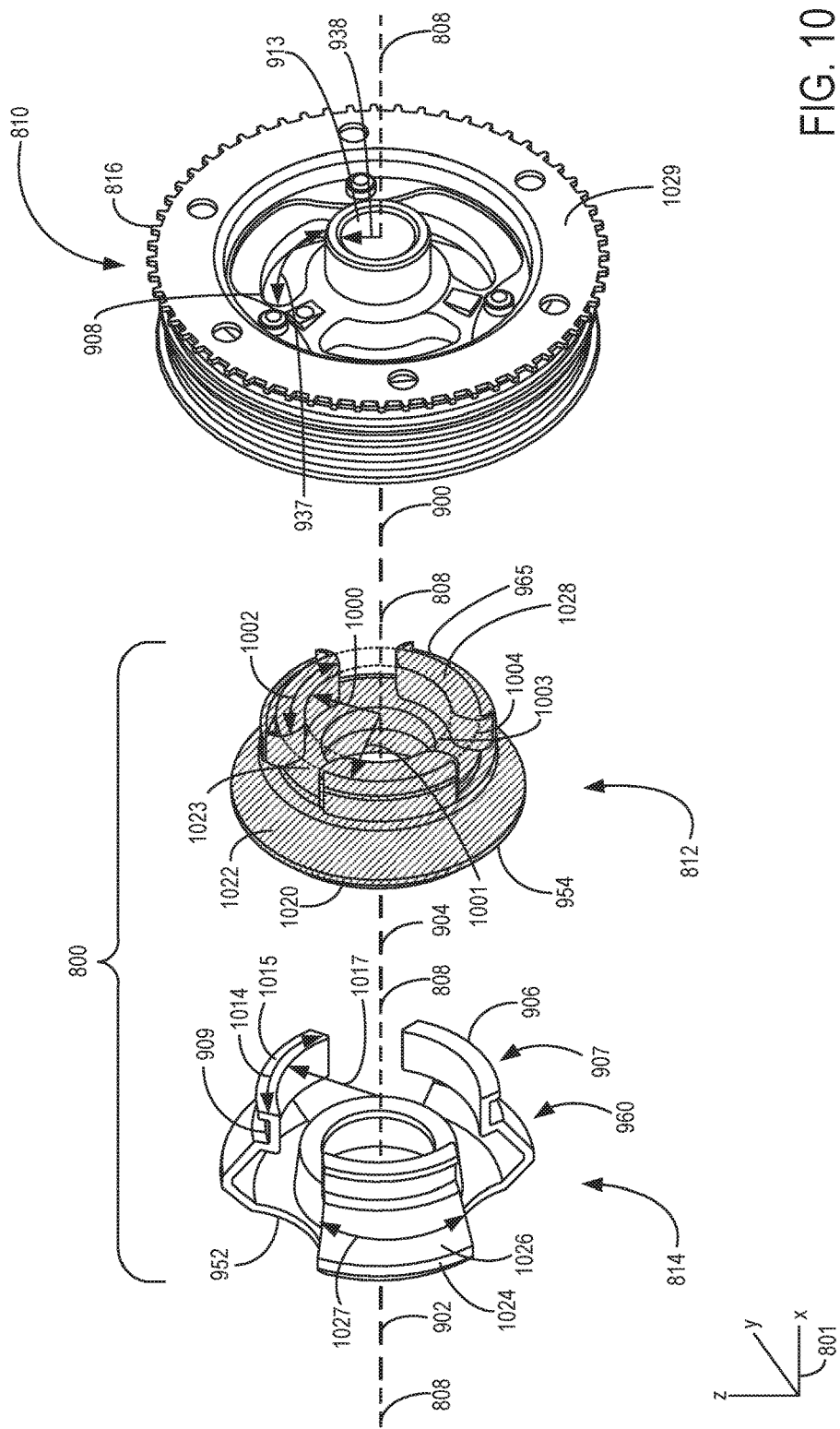
FIG. 10 shows an exploded view of the second embodiment of the damper cover from a second perspective.
Figure 11:
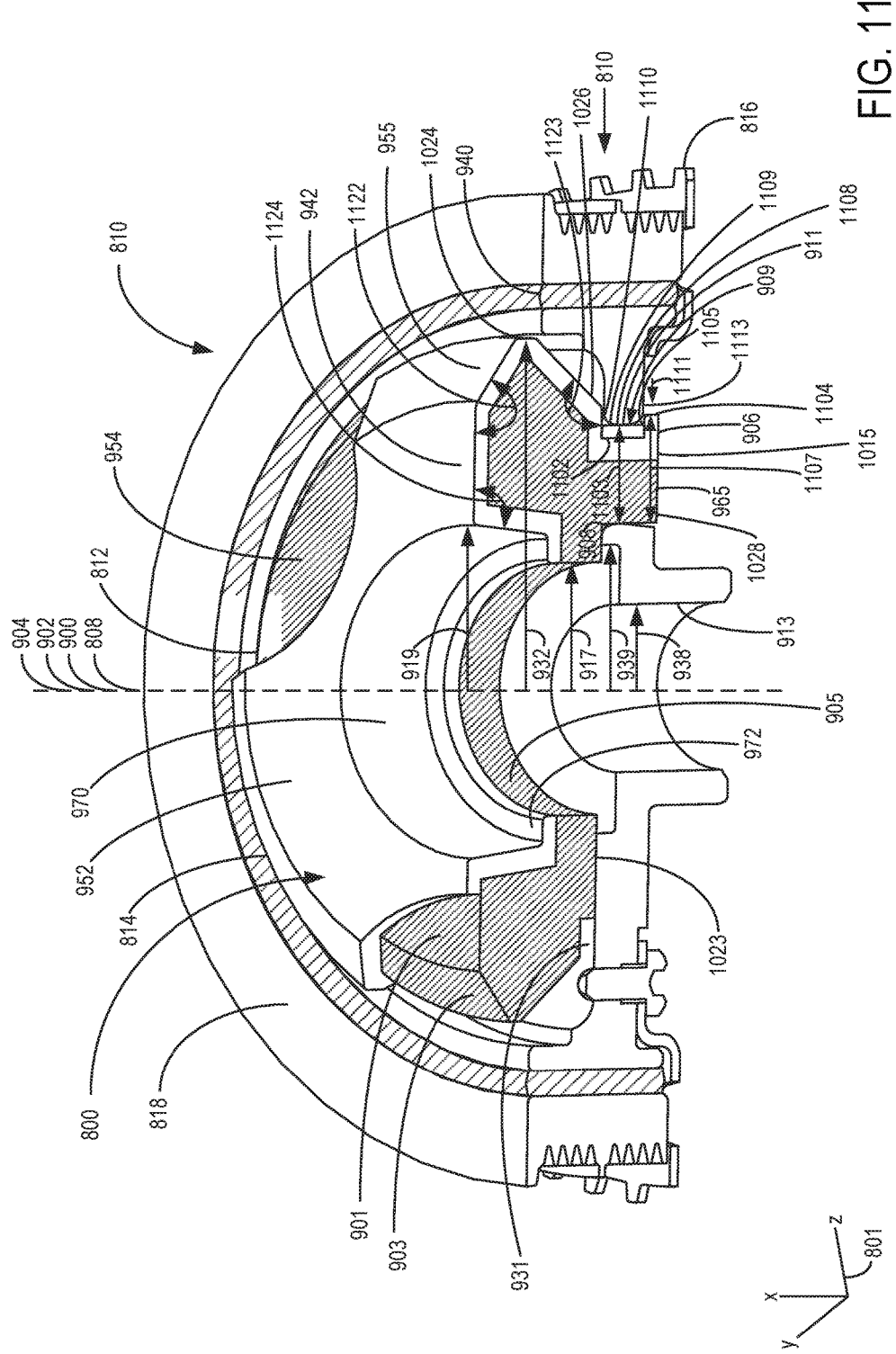
FIG. 11 shows a cross-sectional view of the second embodiment of the damper cover coupled to the crankshaft damper from a first perspective.
Figure 12:
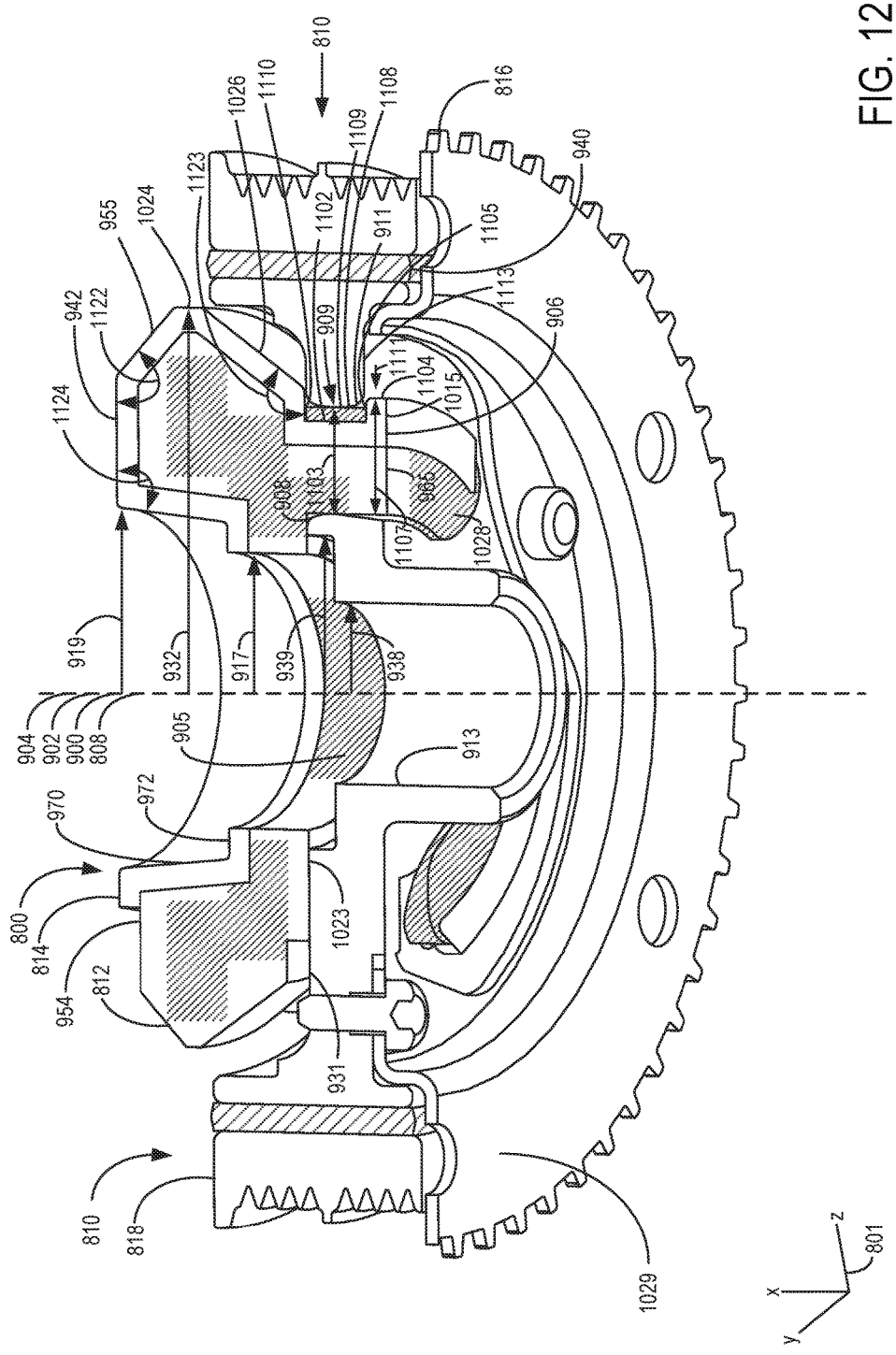
FIG. 12 shows a cross-sectional view of the second embodiment of the damper cover coupled to the crankshaft damper from a second perspective.

Each frame extension 906 of the frame 814 includes a first guide surface 955 angled (as shown by FIGS. 11-12 and described below) relative to the base surface 942 and coupled to the base surface 942. Each first guide surface 955 extends away from the base surface 942 and the frame axis 902, and toward an end of the frame 814 opposite to the base surface 942. The first guide surfaces 955 are formed by the frame extensions 906 and are positioned circumferentially (e.g., along outer circumference 916) around the base surface 942. A width of each first guide surface 955 may correspond to a difference in length between a second radius 932 and the first radius 920, with a length of the second radius 932 being greater than the length of the first radius 920. In other words, the width of each first guide surface 955 may be a length between a guide circumference 914 and the outer circumference 916. An outer edge of each first guide surface 955 is positioned along the guide circumference 914 (arranged circumferentially to the frame axis 902) while an inner edge of each first guide surface 955 is positioned along the outer circumference 916 (also arranged circumferentially to the frame axis 902), with the guide circumference 914 being greater than the outer circumference 916. The surfaces of the frame 814 are described in further detail below with reference to FIGS. 10-12.

An inset base 954 of the inset 812 includes a planar outer surface 901 (which may herein be referred to as an outermost planar surface) with an approximately ring-like (e.g., annular) shape. The inset axis 904 intersects a midpoint 957 of the inset 812 and the planar outer surface 901 is positioned circumferentially around the inset axis 904. An outer circumference 961 (e.g., an outer perimeter) of the planar outer surface 901 is positioned a radial distance 923 from the inset axis 904 along an outer edge of the planar outer surface 901 (e.g., an edge of the planar outer surface 901 positioned furthest from the inset axis 904). The inner circumference 956 of the planar outer surface 901 is positioned a radial distance 921 from the inset axis 904 along an inner edge of the planar outer surface 901 (e.g., an edge of the planar outer surface 901 positioned closest to the inset axis 904). A width of the planar outer surface 901 corresponds to a difference in length between radial distance 921 and radial distance 923.

The planar outer surface 901 is coupled to a second outer surface 903, with the second outer surface 903 angled relative to the planar outer surface 901. An inner edge (e.g., an edge arranged nearest to the inset axis 904) of the second outer surface 903 is coupled to the planar outer surface 901 and positioned along the outer circumference 961, while an outer edge (e.g., an edge arranged furthest from the inset axis 904) is positioned along the circumference 963 (e.g., positioned a radial distance 925 from the inset axis 904).

The planar outer surface 901 is coupled to a first sidewall 912 of the inset 812. The first sidewall 912 is arranged perpendicular to the planar outer surface 901 and extends away from the planar outer surface 901 in a direction parallel to the inset axis 904 (e.g., in a direction of the planar slot surface 931 of the damper 810 when the damper cover 800 is coupled to the damper 810). The first sidewall 912 is coupled to an inner surface 922 (e.g., an inner planar surface) of the inset 812, with the inner surface 922 arranged parallel to the planar outer surface 901 and positioned away from the planar outer surface 901 in a direction parallel to the inset axis 904. The inner surface 922 is coupled to a second sidewall 905 of the inset 812. The second sidewall 905 is arranged parallel to the first sidewall 912 (e.g., both of the first sidewall 912 and second sidewall 905 are arranged circumferentially around the inset axis 904) and extends away from the planar outer surface 901 and the inner surface 922. The first sidewall 912 is positioned away from the inset axis 904 by radial distance 921 while the second sidewall 905 is positioned away from the inset axis 904 by radial distance 917.

The inset 812 also includes a plurality of inset extensions 965, with each inset extension 965 extending away from the inset 812 (e.g., away from the planar outer surface 901) in a direction parallel to the inset axis 904. Each inset extension 965 is coupled to (e.g., formed by) the inset 812 and is positioned circumferentially about the inset axis 904. In one example, each inset extension 965 is arranged symmetrically around the inset axis 904 and is configured to align with a corresponding frame extension 906 of the frame 814. In the embodiment shown by FIGS. 8-12, the inset 812 includes three inset extensions 965 and the frame 814 includes three corresponding frame extensions 906. Alternate embodiments may include a different number and/or arrangement of inset extensions, with the number and arrangement of the inset extensions matching the number and arrangement of the frame extensions 906 (e.g., inset extensions may be arranged asymmetrically around the inset to correspond with extensions arranged asymmetrically around the frame). The inset extensions 965 and surfaces of the inset 812 are described in further detail below with reference to FIGS. 10-12.

In the configuration described above, the frame extensions 906 of the frame 814 are positioned to align with the elongate slots 908, and each inset extension 965 is shaped to fit within and surround a portion of a corresponding frame extension 906. By forming the inset 812 and the frame 814 together as the damper cover 800 in this configuration, the frame may retain a shape of the damper cover 800 while the inset 812 may increase a damping characteristic of the damper 810. For example, the damper cover 800 may be positioned within the damper 810 such that the inset 812 is in face-sharing contact with the planar slot surface 931. Additionally, by aligning the frame extensions 906 with the elongate slots 908 (as described in further detail below with reference to FIGS. 11-12), the damper cover 800 may be coupled to the damper 810 without the use of fasteners (e.g., bolts).

FIG. 10 shows the inset 812 and frame 814 of the damper cover 800, along with the damper 810, in an exploded view from a second perspective, with the second perspective approximately perpendicular to the first perspective shown by FIG. 9 as indicated by reference axes 801.

The damper 810 is shown to include innermost planar surface 1029 arranged parallel to the planar slot surface 931

(shown by FIG. 9). The planar slot surface 931 of the damper 810 is positioned closer to the innermost planar surface 1029 of the damper 810 than the first outer surface 818 of the damper 810, along the assembly axis 808. In other words, the planar slot surface 331 is positioned away from the first outer surface 818 and towards the innermost planar surface 1029 in a direction parallel to the assembly axis 208. The timing ring 816 is coupled to (and formed by) the innermost planar surface 1029.

The inset 812 includes a third outer surface 1020 and a fourth outer surface 1022. The third outer surface 1020 is coupled to the second outer surface 903 and is arranged perpendicular to the inset axis 904. The fourth outer surface 1022 is coupled to the third outer surface 1020 and is angled relative to a surface parallel to the base surface 942 (as described below with reference to FIGS. 11-12). The second outer surface 903, third outer surface 1020, and fourth outer surface 1022 are adapted to match a shape of the frame 814. Specifically, the relative arrangement of the second outer surface 903, third outer surface 1020, and fourth outer surface 1022 is similar to a relative arrangement of the first guide surface 955, a second guide surface 1024, and a third guide surface 1026, as described below.

Each inset extension 965 includes an elongate surface 1028 with an inner edge positioned along a first circumference 1003 and an outer edge positioned along a second circumference 1004. In other words, each elongate surface 1028 is positioned away from the inset axis 904 by a first radius 1000 and extends away from the inset axis 904 to a second radius 1001. Each elongate surface 1028 has an arc length 1002 in a direction around the inset axis 904. In one example, the arc length 1002 is approximately the same (e.g., a same amount of length) as the length 937 of the elongate slots 908. The arc length 1002 may be slightly less than the length 937 of the elongate slots 908 so that each inset extension 965 may be inserted into a corresponding elongate slot 908 when the damper cover 800 is coupled to the damper 810.

Each of the inset extensions 965 are coupled to an annular surface 1023 positioned opposite to the base surface 942 in a direction parallel to the inset axis 904. The annular surface 1023 is configured to fit within the damper 810 (e.g., configured to be in face-sharing contact with the planar slot surface 931) when the damper cover 800 is coupled to the damper 810 as shown by FIGS. 11-12.

Each frame extension 906 includes the first guide surface 955, the second guide surface 1024, and the third guide surface 1026. As described above, the first guide surface 955 is coupled to the base surface 942 and is angled relative to the base surface 942. The second guide surface 1024 is coupled to the first guide surface 955 and is arranged perpendicular to the first guide surface 955. The third guide surface 1026 is coupled to the second guide surface 1024 and extends away from the base surface 942 and at an angle toward the frame axis 902. Each frame extension 906 includes an indentation 909 adapted to couple the frame extension 906 to a corresponding elongate slot 908 as described below with reference to FIGS. 11-12.

An arc length 1014 of an elongate surface 1015 of each frame extension 906 in a direction around the frame axis 902 may be approximately the same as the arc length 1002 of each elongate surface 1028 of each inset extension 965 as described above. The arc length 1014 of each elongate surface 1015 along the tab end 907 of each frame extension 906) may be smaller (e.g., a decreased amount of length) relative to an arc length 1027 of a corresponding guide end 960 (e.g., a length along the third guide surface 1026) of each frame extension 906. By configuring the frame extensions 906 in this way, the frame 814 (and therefore the damper cover 800) may be more easily inserted into the damper 810. The reduced arc length 1014 of the tab end 907 of each frame extension 906 relative to the arc length 1027 of the guide end 960 increases an ease with which each frame extension 906 may be inserted into the elongate slots 908. In other words, each frame extension 906 tapers (e.g., narrows) in arc length from the corresponding guide end 960 to the corresponding tab end 907 so that each frame extension 906 may be more easily inserted within a corresponding elongate slot 908.

The elongate surface 1015 of each frame extension 906 is positioned circumferential to (e.g., around) the frame axis 902, and away from the frame axis 902 by a distance indicated by radius 1017. The radius 1017 has a length greater than the second radius 1001 of the inset 812. As a result, when the inset 812 and frame 814 are coupled together as the damper cover 800, each of the elongate surfaces 1015 of the frame 814 are positioned further away from the frame axis 902 than the elongate surfaces 1028 of the inset 812. In this way, a portion of the inset 812 fits within the frame 814. Additionally, the similar arrangement of the first guide surface 955, second guide surface 1024, and third guide surface 1026 of the frame 814 relative to the second outer surface 903, third outer surface 1020, and fourth outer surface 1022 of the inset 812 permits the frame 814 to partially surround the inset 812. A portion of the inset 812 surrounds each indentation 909 of each frame extension 906. In this way, the damper cover 800 may fit within and be coupled to the damper 810 as described below with reference to FIGS. 11-12.

FIGS. 11-12 show perspective views of the damper cover 800 installed within the damper 810, with the damper 810 and damper cover 800 shown in cross-section. The damper cover 800 is secured (e.g., locked) within the damper 810 via the frame extensions 906 as described below.

Each frame extension 906 of the frame 814 includes a corresponding elongate surface 1015 arranged parallel to the base surface 942 and positioned away from the base surface 942 in a direction parallel to the frame axis 902 as described above. The elongate surface 1015 is also positioned away from the frame axis 902 and extends away from the frame axis 902 in a direction perpendicular to the frame axis 902.

The elongate surface 1015 is coupled to a second frame surface 1104 arranged parallel to the frame axis 902 and extending toward the base surface 942. The second frame surface 1104 is coupled to a third frame surface 1105 arranged perpendicular to the frame axis 902 and extending toward the frame axis 902. The third frame surface 1105 is coupled to a fourth frame surface 1102 arranged parallel to the frame axis 902 and extending toward the base surface 942. The fourth frame surface 1102 is coupled to a fifth frame surface 1110 arranged perpendicular to the frame axis 902 and extending away from the frame axis 902. Together, the third frame surface 1105, the fourth frame surface 1102, and the fifth frame surface 1110 form the indentation 909. The tab end 907 of each frame extension 906 is adapted to lock around a corresponding elongate slot 908 of the damper 810 via the indentation 909. For example (as described below), a compressive force may compress each tab end 907 as the damper cover 800 is inserted into the damper 810, and when the compressive force is released, the surfaces of the indentation 909 (as described above) of each tab end 907 are configured to surround the sidewall 911 of a corresponding elongate slot 908. A portion of the inset 812 is positioned within each indentation 909 in order to reduce an amount of contact between the each indentation 909 and each corresponding sidewall 911. In other words, the indentation 909 is surrounded by a protrusion 1108 of the inset 812. The protrusion 1108 is in face-sharing contact with an outer surface 1109 of the sidewall 911 when the damper cover 800 is coupled to the damper 810, as described further below.

The fifth frame surface 1110 is coupled to the third guide surface 1026, with the third guide surface 1026 arranged at a first angle 1123 relative to the fifth frame surface 1110. The third guide surface 1026 extends away from the frame axis 902 and is positioned between the fifth frame surface 1110 and the second guide surface 1024.

The second guide surface 1024 is arranged parallel to the frame axis 902 and extends away from the third guide surface 1026. The second guide surface 1024 is positioned away from the frame axis 902 by second radius 932.

The second guide surface 1024 is coupled to the first guide surface 955, with the first guide surface 955 extending in a direction of both of the frame axis 902 and the base surface 942. In other words, the first guide surface 955 is positioned between the base surface 942 and the second guide surface 1024, and couples the base surface 942 to the second guide surface 1024. The first guide surface 955 is angled relative to the base surface 942 by a second angle 1122.

The base surface 942 is coupled to the frame sidewall 970 as described above with reference to FIG. 9. The frame sidewall 970 is arranged at a third angle 1124 relative to the base surface 942 and couples the base surface 942 to the frame inner surface 972.

In the configuration described above, the damper cover 800 may be coupled to the damper 810 and secured within the damper 810 without the use of fasteners (e.g., bolts). For example, each frame extension 906 may be compressed in a direction perpendicular to the assembly axis 808 and toward the assembly axis 808 by a compressive force 1111. In one example, the compressive force 1111 may be a pressing force from a person installing the damper cover 800 onto the damper 810. The compressive force 1111 may be applied to the damper cover 800 such that each inset extension 965 temporarily deforms (e.g., compresses), and each frame extension 906 may fit into a corresponding elongate slot 908 of the damper 810. In other words, the compressive force 1111 compresses a portion of the damper cover 800 (e.g., a portion including the inset extension 965 and frame extension 906) from a first length 1107 to a second length 1103, with the second length 1103 being a smaller amount of length than the first length 1107. Each frame extension 906 may be inserted into the damper 810 to a depth at which an entirety of the third frame surface 1105 of each frame extension 906 is positioned beyond an interior surface 1113 (e.g., a surface coupled to the outer surface 1109 of the elongate slots 908 and arranged opposite to the planar slot surface 931 in a direction parallel to the assembly axis 808) in a direction parallel to the assembly axis 808. When each frame extension 906 is inserted into the damper 810 as described above, the compressive force 1111 may be released (e.g., removed) and a restoring force of each frame extension 906 (e.g., a force in a direction opposite to the compressive force 1111 and resulting from decompression of the damper cover 800) may press (e.g., clamp) the protrusion 1108 surrounding the indentation 909 of each frame extension 906 into face-sharing contact with the corresponding outer surface 1109.

In this way, the damper cover 800 may be coupled and secured (e.g., locked) to the damper 810 without the use of fasteners. By configuring the indentation 909 of each frame extension 906 to be surrounded by the protrusions 1108 of the inset 812, an amount of the frame 814 that is in contact with the damper 810 may be reduced. Additionally, when the damper cover 800 is coupled to the damper 810, the annular surface 1023 of the inset 812 is in face-sharing contact with the planar slot surface 931. The contact between the annular surface 1023 and the planar slot surface 931 may further reduce the amount of the frame 814 that is in contact with the damper 810.

The technical effect of decreasing the amount of contact between the damper 810 and the frame 814 is to increase a noise, vibration, and harshness damping characteristic of the damper cover 800. Additionally, by securing the damper cover to the damper without the use of fasteners, installation of the damper cover is simplified and a speed of installation may be increased.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In one embodiment, a system includes: a crankshaft damper cover, including: a frame including a first plurality of extensions arranged around a perimeter of the frame and extending from a base of the frame in a direction of a centerline of the cover; and an inset molded around the frame and including a second plurality of extensions aligned with the first plurality of extensions. In a first example of the system, the system includes a crankshaft damper including a planar slot surface including a plurality of elongate slots arranged around a central axis of the crankshaft damper, where the central axis is aligned with the centerline of the cover. A second example of the system optionally includes the first example, and further includes wherein each extension of the first plurality of extensions and the second plurality of extension extends through and clamps to one slot of the plurality of elongate slots, where a portion of each extension of the second plurality of extensions is positioned between a corresponding extension of the first plurality of extensions and sidewalls of one slot. A third example of the system optionally includes one or each of the first and second examples, and further includes wherein each extension of the first plurality of extensions includes a tab end adapted to lock around one slot of the plurality of elongate slots, the tab end including an indented surface and wherein the portion of each extension of the second plurality of extensions is positioned over the indented surface and in face-sharing contact with the sidewalls of the one slot when the crankshaft damper cover is coupled to the crankshaft damper. A fourth example of the system optionally includes one or more or each of the first through third examples, and further includes wherein the planar slot surface of the crankshaft damper is positioned closer to an outermost planar surface of the crankshaft damper than an innermost planar surface of the crankshaft damper, along the central axis, where the planar slot surface, outermost planar surface, and innermost surface are arranged parallel to one another and perpendicular to the central axis. A fifth example of the system optionally includes one or more or each of the first through fourth examples, and further includes wherein the inset includes a plurality of tabs arranged around a perimeter of the inset at an outer surface of a base of the inset and wherein the second plurality of extensions extend outward from the base of the inset, away from the outer surface of the base of the inset. A sixth example of the system optionally includes one or more or each of the first through fifth examples, and further includes wherein a portion of each extension of the first plurality of extensions is positioned between two adjacent tabs of the plurality of tabs. A seventh example of the system optionally includes one or more or each of the first through sixth examples, and further includes wherein the planar slot surface of the crankshaft damper is depressed into the crankshaft damper and positioned closer to an innermost planar surface of the crankshaft damper than an outermost planar surface of the crankshaft damper, along the central axis, where the planar slot surface, outermost planar surface, and innermost surface are arranged parallel to one another and perpendicular to the central axis. An eighth example of the system optionally includes one or more or each of the first through seventh examples, and further includes wherein the inset includes an inset sidewall arranged around the centerline and coupled between an outermost planar surface of the inset and an innermost planar surface of the inset. A ninth example of the system optionally includes one or more or each of the first through eighth examples, and further includes wherein the frame includes a frame sidewall positioned around the centerline and coupled between the base of the frame and an innermost planar surface of the frame, where the frame sidewall is coupled with the inset sidewall and a line normal to the innermost planar surface of the frame is parallel to the centerline.

In another embodiment, a system includes: a crankshaft damper cover, including: a frame including a plurality of first extensions arranged around a perimeter of the frame and extending from a base of the frame, where each first extension includes an open, tabbed end with an indented locking element positioned proximate to the base and a closed, guide end positioned away from the base; and an inset molded around the frame and comprised of a damping material. In a first example of the system, the system includes a crankshaft damper including a planar, first surface including a plurality of elongate slots arranged around a central axis of the crankshaft damper, the first surface arranged proximate to and in parallel with an outermost planar surface of the crankshaft damper. A second example of the system optionally includes the first example, and further includes wherein each first extension extends from the base of the frame toward the first surface, in a direction of the central axis, and wherein the indented locking element is positioned proximate to the base relative to an axial direction. A third example of the system optionally includes one or each of the first and second examples, and further includes wherein the base is positioned between a planar, outer face of the inset and the first surface, the outer face of the inset arranged parallel to the base and the first surface. A fourth example of the system optionally includes one or more or each of the first through third examples, and further includes wherein each first extension narrows, in a circumferential direction, from the tabbed end to the guide end.

In another embodiment, a system includes: a crankshaft damper cover, includes: a frame including a plurality of first extensions arranged around a perimeter of the frame and extending from a base of the frame, where each first extension includes an open, tabbed end with an indented locking element positioned away from the base and a closed, guide end positioned at the base; and an inset molded with the frame and comprised of a damping material, where the guide end of each first extension is formed around an annular base of the inset. In a first example of the system, the system includes a crankshaft damper including a planar slot surface, the planar slot surface depressed into an interior of the crankshaft damper from an outermost planar surface of the crankshaft damper and including a plurality of slots positioned within the planar slot surface and arranged around a central axis of the crankshaft damper. A second example of the system optionally includes the first example, and further includes wherein the tabbed end of each first extension extends through each slot of the plurality of slots when the crankshaft damper cover is coupled with the crankshaft damper. A third example of the system optionally includes one or each of the first and second examples, and further includes wherein the inset includes a plurality of second extensions extending from the annular base. A fourth example of the system optionally includes one or more or each of the first through third examples, and further includes wherein a protrusion of each second extension of the plurality of second extensions surrounds the indented locking element of a corresponding first extension of the plurality of first extensions.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a crankshaft damper cover, comprising:
      a frame including a first plurality of extensions arranged around a perimeter of the frame and extending from a base of the frame in a direction of a centerline of the cover; and
      an inset molded around the frame and including a second plurality of extensions aligned with the first plurality of extensions.

2. The system of claim 1, further comprising a crankshaft damper including a planar slot surface including a plurality of elongate slots arranged around a central axis of the crankshaft damper, where the central axis is aligned with the centerline of the cover.

3. The system of claim 2, wherein each extension of the first plurality of extensions extends through and clamps to one slot of the plurality of elongate slots, where each extension of the second plurality of extensions extends through one of the plurality of elongate slots, and where an inset protrusion of each extension of the second plurality of extensions is positioned between a corresponding extension of the first plurality of extensions and sidewalls of one slot of the plurality of elongate slots.

4. The system of claim 3, wherein each extension of the first plurality of extensions includes a tab end adapted to lock around one slot of the plurality of elongate slots, the tab end including an indented surface, and wherein the inset protrusion of each extension of the second plurality of extensions is positioned over the indented surface and in face-sharing contact with the sidewalls of the one slot of the plurality of elongate slots when the crankshaft damper cover is coupled to the crankshaft damper.

5. The system of claim 4, wherein the planar slot surface of the crankshaft damper is positioned closer to an outermost planar surface of the crankshaft damper than an innermost planar surface of the crankshaft damper, along the central axis, where the planar slot surface, outermost planar surface, and innermost planar surface are arranged parallel to one another and perpendicular to the central axis.

6. The system of claim 5, wherein the inset includes a plurality of tabs arranged around a perimeter of the inset at an outer surface of a base of the inset and wherein the second plurality of extensions extends outward from the base of the inset, away from the outer surface of the base of the inset.

7. The system of claim 6, wherein a portion of each extension of the first plurality of extensions is positioned between two adjacent tabs of the plurality of tabs.

8. The system of claim 4, wherein the planar slot surface of the crankshaft damper is depressed into the crankshaft damper and positioned closer to an innermost planar surface of the crankshaft damper than an outermost planar surface of the crankshaft damper, along the central axis, where the planar slot surface, outermost planar surface, and innermost planar surface are arranged parallel to one another and perpendicular to the central axis.

9. The system of claim 8, wherein the inset includes an inset sidewall arranged around the centerline and coupled between an outermost planar surface of the inset and an innermost planar surface of the inset.

10. The system of claim 9, wherein the frame includes a frame sidewall positioned around the centerline and coupled to the base of the frame, where the frame sidewall is coupled with the inset sidewall.

11. A system, comprising:
    a crankshaft damper cover, comprising:
       a frame including a plurality of first extensions arranged around a perimeter of the frame and extending from a base of the frame, where each first extension includes an open tab end with an indented locking element positioned proximate to the base and a closed guide end positioned away from the base; and
       an inset molded around the frame and comprised of a damping material.

12. The system of claim 11, further comprising a crankshaft damper including a planar first surface including a plurality of elongate slots arranged around a central axis of the crankshaft damper, the planar first surface arranged proximate to, and in parallel with, an outermost planar surface of the crankshaft damper.

13. The system of claim 12, wherein each first extension extends from the base of the frame toward the planar first surface, in a direction of the central axis, and wherein the indented locking element is positioned proximate to the base relative to an axial direction.

14. The system of claim 12, wherein the base is positioned adjacent to a planar outer face of the inset and the planar first surface, the planar outer face of the inset arranged parallel to the base and the planar first surface.

15. The system of claim 11, wherein each first extension narrows, in a circumferential direction, from the tab end to the guide end.

16. A system, comprising:
    a crankshaft damper cover, comprising:
       a frame including a plurality of first extensions arranged around a perimeter of the frame and extending from a base of the frame, where each first extension includes an open tab end with an indented locking element positioned away from the base and a closed guide end positioned at the base, the indented locking element locking with a slot of a crankshaft damper; and an inset molded with the frame and comprised of a damping material, where the closed guide end of each first extension is formed around an annular base of the inset.

17. The system of claim 16, where the slot is included in a planar slot surface, the planar slot surface depressed into an interior of the crankshaft damper from an outermost planar surface of the crankshaft damper and including a plurality of slots positioned within the planar slot surface and arranged around a central axis of the crankshaft damper, the slot included in the plurality of slots.

18. The system of claim 17, wherein the tab end of each first extension extends through each slot of the plurality of slots when the crankshaft damper cover is coupled with the crankshaft damper.

19. The system of claim 16, wherein the inset includes a plurality of second extensions extending from the annular base.

20. The system of claim 19, wherein a protrusion of each second extension of the plurality of second extensions surrounds the indented locking element of a corresponding first extension of the plurality of first extensions.

* * * * *